US011522478B2

(12) United States Patent
Wang

(10) Patent No.: US 11,522,478 B2
(45) Date of Patent: Dec. 6, 2022

(54) SYSTEMS AND METHODS FOR PREDICTIVE LOAD RESPONSE

(71) Applicant: Cummins Power Generation Inc., Minneapolis, MN (US)

(72) Inventor: Kai Wang, Columbus, IN (US)

(73) Assignee: Cummins Power Generation Inc., Minneapolis, MN (US)

( * ) Notice: Subject to any disclaimer, the term of this patent is extended or adjusted under 35 U.S.C. 154(b) by 0 days.

(21) Appl. No.: 17/300,300

(22) Filed: May 5, 2021

(65) Prior Publication Data

US 2022/0360202 A1 Nov. 10, 2022

(51) Int. Cl.
*H02P 9/02* (2006.01)
*G05F 1/12* (2006.01)

(52) U.S. Cl.
CPC . *H02P 9/02* (2013.01); *G05F 1/12* (2013.01)

(58) Field of Classification Search
CPC ................................. H02P 9/02; H02P 9/102
See application file for complete search history.

(56) References Cited

U.S. PATENT DOCUMENTS

| 6,351,692 | B1 | 2/2002 | Eaton et al. |
| 6,700,356 | B1 | 3/2004 | Dorn |
| 6,745,109 | B2 | 6/2004 | Kojima et al. |
| 6,901,324 | B2 | 5/2005 | Rose et al. |
| 7,752,150 | B2 | 7/2010 | Ye et al. |
| 8,195,339 | B2 | 6/2012 | Long et al. |
| 8,205,594 | B2 | 6/2012 | Fore et al. |
| 8,237,300 | B2 | 8/2012 | Allen |
| 8,483,982 | B2 | 7/2013 | Hancock et al. |
| 8,862,279 | B2 | 10/2014 | Darden et al. |
| 9,048,765 | B2 | 6/2015 | Dobbs |
| 10,491,004 | B2 | 11/2019 | Gerdes et al. |
| 2007/0055392 | A1 | 3/2007 | D'Amato et al. |
| 2008/0157600 | A1 | 7/2008 | Marlenee et al. |
| 2010/0106389 | A1 | 4/2010 | Fore et al. |
| 2015/0236630 | A1 | 8/2015 | Cooper et al. |

(Continued)

FOREIGN PATENT DOCUMENTS

| EP | 2 783 460 B1 | 10/2014 |
| EP | 2 875 566 A1 | 5/2015 |

OTHER PUBLICATIONS

International Search Report and Written Opinion from PCT Appl. Ser. No. PCT/US2022/027470 dated Aug. 16, 2022 (16 pages).

*Primary Examiner* — Sean Gugger
(74) *Attorney, Agent, or Firm* — Foley & Lardner LLP

(57) ABSTRACT

Systems and methods for regulating transient deviations in an output voltage of a power generator system are provided. An automatic voltage regulator (AVR) may receive a predictive load signal from a load. The predictive load signal may relate to an anticipated change in the load. The predictive load signal can be configured to include information of the anticipated change in the load. The AVR may extract the information of the anticipated change in the load from the predictive load signal, responsive to receiving the predictive load signal. The AVR may analyze the extracted information to determine whether the anticipated change causes a transient deviation above a predetermined level in the output voltage. The AVR may adjust an excitation current of an alternator prior to detecting a difference between a voltage setpoint and the output voltage, responsive to determining that the anticipated change in the load causes the transient deviation.

20 Claims, 10 Drawing Sheets

(56) References Cited

U.S. PATENT DOCUMENTS

| | | |
|---|---|---|
| 2017/0070043 A1 | 3/2017 | Smith et al. |
| 2018/0262139 A1 | 9/2018 | Oguguo et al. |
| 2018/0316220 A1 | 11/2018 | Frampton |
| 2019/0148977 A1 | 5/2019 | Kuroda et al. |

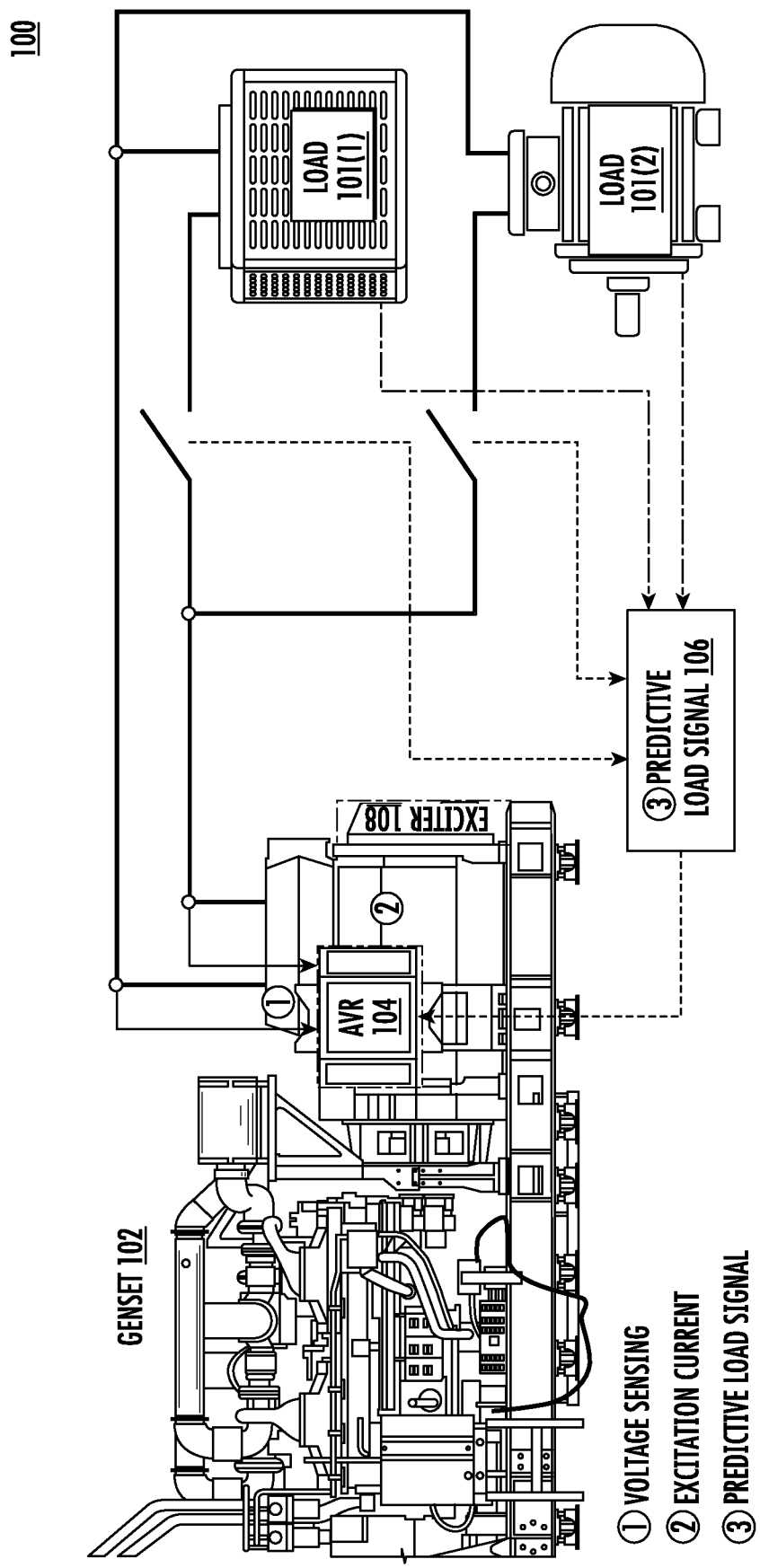

SYSTEMS AND METHODS FOR PREDICTIVE LOAD RESPONSE

TECHNICAL FIELD

The present disclosure relates generally to monitoring and control of generator sets (gensets).

BACKGROUND

Generator sets (gensets) can be used for power generation in locomotives, trucks, recreational vehicles, marine vessels as well as for grid power generation. Gensets may include a prime mover, such as an internal combustion (IC) engine, that converts fuel into mechanical energy to rotate a generator (e.g., an alternator). The generator can convert the mechanical energy into useable electrical energy at a line voltage and frequency suitable for transmission and utilization. Applying (or removing) a load to (or from) a genset may cause variations in the voltage or frequency of said electrical energy. The size of the applied (or removed) load may determine the extent of the variations in voltage or frequency. The response of the genset to the variations in voltage or frequency can determine the transient performance of the genset.

SUMMARY

One embodiment of the disclosure relates to a method of regulating transient deviations in an output voltage of a genset. The method includes receiving, by an automatic voltage regulator of the genset from a load, a predictive load signal relating to an anticipated change in the load. The predictive load signal may be configured to include information of the anticipated change in the load. The method includes extracting, by the automatic voltage regulator, the information of the anticipated change in the load from the predictive load signal, responsive to receiving the predictive load signal. The method includes analyzing, by the automatic voltage regulator, the extracted information to determine whether the anticipated change in the load causes a transient deviation above a predetermined level in an output voltage of the genset. The method includes adjusting, by the automatic voltage regulator, an excitation current of an alternator of the genset prior to detecting a difference between a voltage setpoint and the output voltage, responsive to determining that the anticipated change in the load causes the transient deviation in the output voltage.

In some embodiments, the automatic voltage regulator may modify the excitation current back to a nominal current value after a period of time. In some embodiments, the predictive load signal may comprise a datalink signal, a circuit breaker trip command, a temperature trigger signal, an analog voltage input, or a discrete switch input. In some embodiments, the information of the anticipated change in the load may include one or more power characteristics of the anticipated change in the load. The one or more power characteristics may comprise a power numerical, a power factor, an inductance, or a capacitance. In some embodiments, the automatic voltage regulator may adjust the excitation current within a predefined interval to regulate the transient deviation in the output voltage. The predefined interval may comprise an interval of time between receiving the predictive load signal and detecting the difference between the voltage setpoint and the output voltage. In some embodiments, the automatic voltage regulator can maintain the excitation current as a nominal current value responsive to determining that the anticipated change in the load fails to cause a transient deviation above the predetermined level in the output voltage of the genset In some embodiments, analyzing the extracted information and adjusting the excitation current may comprise storing, by the automatic voltage regulator, a table. The table may comprise one or more output voltage deviation values and one or more predetermined load change values. The one or more output voltage deviation values can be associated with the one or more predetermined load change values. In some embodiments, the automatic voltage regulator may compare the information of the anticipated change in the load to the output voltage deviation values or the predetermined load change values stored in the table. In some embodiments, the automatic voltage regulator may determine whether the anticipated change in the load causes a transient deviation above the predetermined level in the output voltage, responsive to comparing the information of the anticipated change in the load to the output voltage deviation values or the predetermined load change values stored in the table. In some embodiments, the automatic voltage regulator may adjust the excitation current of the alternator according to the output voltage deviation values or the predetermined load change values stored in the table, responsive to determining the anticipated change in the load causes the transient deviation in the output voltage. In some embodiments, adjusting the excitation current of the alternator may comprise regulating the transient deviation in the output voltage to a voltage value that is up to 20% of a nominal voltage value.

Another embodiment relates to a control device for an automatic voltage regulator. The control device includes a machine-readable storage medium having instructions stored thereon. The control device includes a processing circuit configured to execute the instructions to receive a predictive load signal relating to an anticipated change in a load of a genset. The predictive load signal can be configured to include information of the anticipated change in the load. The control device includes a processing circuit configured to execute the instructions to extract the information of the anticipated change in the load from the predictive load signal, responsive to receiving the predictive load signal. The control device includes a processing circuit configured to execute the instructions to analyze the extracted information to determine whether the anticipated change in the load causes a transient deviation above a predetermined level in an output voltage of the genset. The control device includes a processing circuit configured to execute the instructions to adjust an excitation current of an alternator of the genset prior to detecting a difference between a voltage setpoint and the output voltage, responsive to determining that the anticipated change in the load causes the transient deviation in the output voltage.

In some embodiments, the control device can be configured to modify the excitation current back to a nominal current value after a period of time. In some embodiments, the control device can be configured to adjust the excitation current within a predefined interval to regulate the transient deviation in the output voltage. The predefined interval may comprise an interval of time between receiving the predictive load signal and detecting the difference between the voltage setpoint and the output voltage. In some embodiments, the control device may be configured to maintain the excitation current as a nominal current value responsive to determining that the anticipated change in the load fails to cause a transient deviation above the predetermined level in the output voltage of the genset.

In some embodiments, the control device may be configured to store a table comprising one or more output voltage deviation values and one or more predetermined load change values. The one or more output voltage deviation values may be associated with the one or more predetermined load change values. In some embodiments, the control device may be configured to compare the information of the anticipated change in the load to the output voltage deviation values or the predetermined load change values stored in the table. In some embodiments, the control device may be configured to determine whether the anticipated change in the load causes a transient deviation above the predetermined level in the output voltage, responsive to comparing the information of the anticipated change in the load to the output voltage deviation values or the predetermined load change values stored in the table. In some embodiments, the control device may be configured to adjust the excitation current of the alternator according to the output voltage deviation values or the predetermined load change values stored in the table, responsive to determining the anticipated change in the load causes the transient deviation in the output voltage.

Another embodiment relates to a power generator system. The power generator system includes an alternator coupled to an engine configured to supply power to a load. The power generator system includes an automatic voltage regulator configured to adjust an excitation current of the alternator to regulate a voltage of an output of the alternator. The power generator system includes a controller comprising a processing circuit configured to receive a predictive load signal relating to an anticipated change in the load. The predictive load signal may be configured to include information of the anticipated change in the load. The power generator system includes a controller comprising a processing circuit configured to extract the information of the anticipated change in the load from the predictive load signal, responsive to receiving the predictive load signal. The power generator system includes a controller comprising a processing circuit configured to analyze the extracted information to determine whether the anticipated change in the load causes a transient deviation above a predetermined level in an output voltage of the power generator system. The power generator system includes a controller comprising a processing circuit configured to adjust the excitation current prior to detecting a difference between a voltage setpoint and the output voltage, responsive to determining that the anticipated change in the load causes the transient deviation in the output voltage.

In some embodiments, the controller of the power generator system can be configured to modify the excitation current back to a nominal current value after a period of time. In some embodiments, the controller of the power generator system can be configured to adjust the excitation current within a predefined interval to regulate the transient deviation in the output voltage. The predefined interval may comprise an interval of time between receiving the predictive load signal and detecting the difference between the voltage setpoint and the output voltage. In some embodiments, the controller of the power generator system can be configured to maintain the excitation current as a nominal current value responsive to determining that the anticipated change in the load fails to cause a transient deviation above the predetermined level in the output voltage of the power generator system.

In some embodiments, the controller of the power generator system can be configured to store a table comprising one or more output voltage deviation values and one or more predetermined load change values. The one or more output voltage deviation values can be associated with the one or more predetermined load change values. In some embodiments, the controller of the power generator system can be configured to compare the information of the anticipated change in the load to the output voltage deviation values or the predetermined load change values stored in the table. In some embodiments, the controller of the power generator system can be configured to determine whether the anticipated change in the load causes a transient deviation above the predetermined level in the output voltage, responsive to comparing the information of the anticipated change in the load to the output voltage deviation values or the predetermined load change values stored in the table. In some embodiments, the controller of the power generator system can be configured to adjust the excitation current of the alternator according to the output voltage deviation values or the predetermined load change values stored in the table, responsive to determining the anticipated change in the load causes the transient deviation in the output voltage.

BRIEF DESCRIPTION OF THE DRAWINGS

The disclosure will become more fully understood from the following detailed description, taken in conjunction with the accompanying figures, wherein like reference numerals refer to like elements, in which:

FIG. 1A-1B are block diagrams illustrating a generator system, according to an exemplary embodiment.

DETAILED DESCRIPTION

Figure 1B:
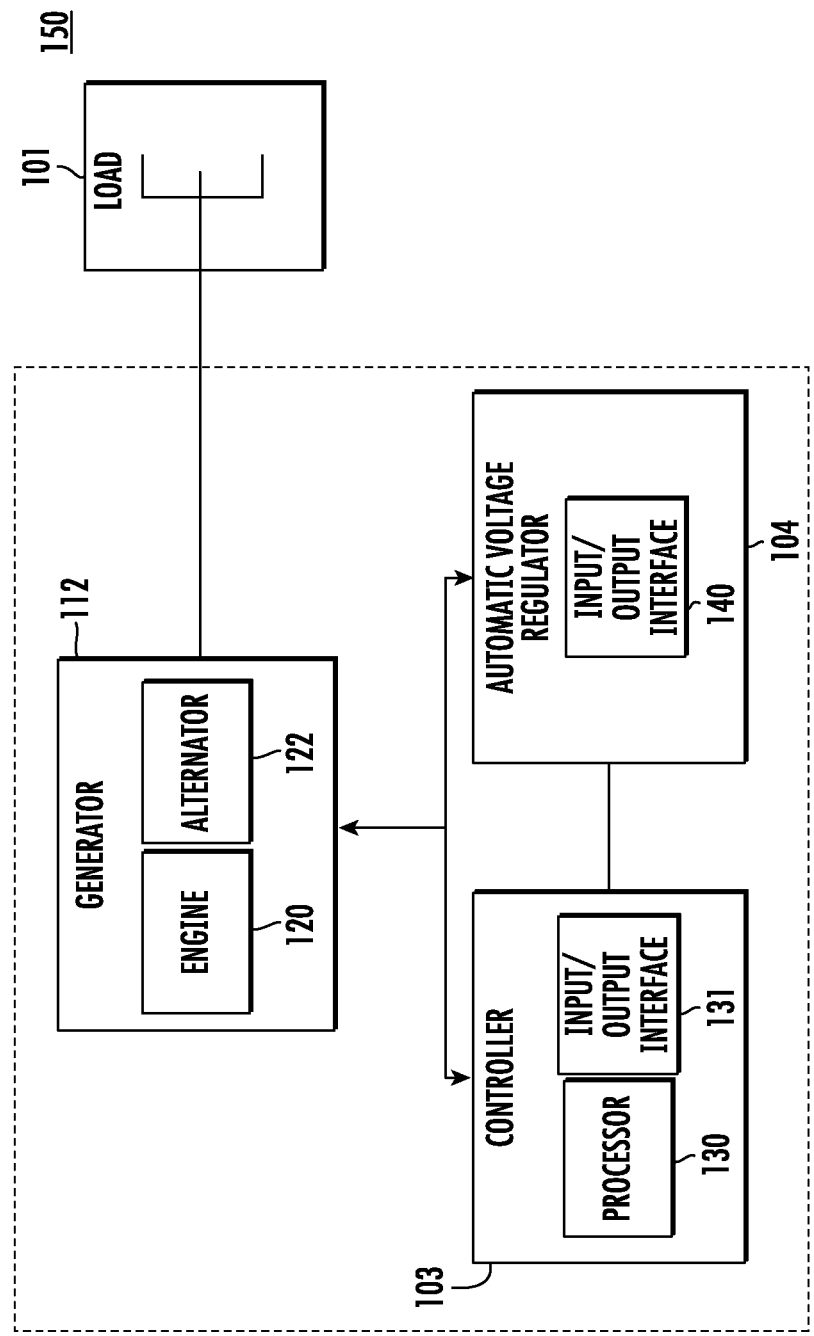

Before turning to the figures, which illustrate the exemplary embodiments in detail, it should be understood that the application is not limited to the details or methodology set forth in the description or illustrated in the figures. It should also be understood that the terminology is for the purpose of description only and should not be regarded as limiting.

Referring generally to the figures, systems and methods that may be used to regulate or control transient deviations in an output voltage of a genset or generator system are provided according to exemplary embodiments. The generator system may include an alternator, an automatic voltage regulator, a controller (or other control devices), and/or other components. The alternator can be coupled to an engine, wherein the alternator is configured to supply power to a load. The automatic voltage regulator and/or the controller may be configured to adjust an excitation current of the alternator to regulate the output voltage of the alternator (e.g., output voltage of the genset).

Certain gensets are widely used for mission and/or critical applications. For instance, gensets can be used as an emergency back-up power supply upon a disruption to a utility power supply. The transient performance of a genset can determine the capability of load acceptance and/or load rejection of the genset. In turn, the load acceptance and/or load rejection capability can determine the electrical characteristics of the genset under a variable load (e.g., load increase or decrease). For instance, the load rejection/acceptance capability can determine the characteristics (e.g., the magnitude) of the transient deviations in the output voltage of the genset. In certain genset applications, such as telecommunications and data centers, the load that is connected to the genset can make severe demands on the voltage of the electrical power supplied by the genset. For said applications, the transient deviations in the output voltage of the genset (e.g., the transient performance of the genset) must meet certain performance requirements. In certain embodiments, the transient performance of the genset (e.g., under variable loads) can be assessed/measured with tests methods, test cycles, and/or other criteria that are defined in certain specifications.

The systems and methods presented herein include a novel approach for regulating or reducing transient deviations in the output voltage of the genset caused by changes in the load. Regulating or reducing the transient deviations in the output voltage of the genset can improve or enhance the transient performance of the genset. According to various example embodiments, the systems and methods presented herein use a predictive load signal to proactively adjust or modify the excitation current of the genset (e.g., of the alternator). Adjusting or modifying the excitation current prior to detecting the change in the load can accommodate the impending/anticipated change in the load and/or reduce the magnitude of the transient deviations. In some embodiments, the automatic voltage regulator (or the controller) of the genset can receive and/or use the predictive load signal to adjust the excitation current. In conventional methods, the AVR regulates the output voltage of the alternator using closed-loop feedback control. Therefore, conventional methods reactively respond to the transient deviations in the output voltage upon detecting an error or difference between a voltage setpoint and a measured/actual/sensed output voltage of the alternator. Responsive to detecting the error or difference, the AVR 104 can adjust the excitation current to reduce the transient deviations caused by a change in the load. Therefore, conventional methods are slow and unable to regulate the output voltage of the genset within a desired range upon a large change in the load.

The present disclosure provides exemplary systems and methods for regulating transient deviations in an output voltage of a genset using a predictive load signal. An exemplary method includes receiving, by at least one controller or automatic voltage regulator (AVR), for example, a predictive load signal from one or more loads of the genset. The predictive load signal may relate to an anticipated change in the load (e.g., a change in the load that has not been detected by the automatic voltage regulator or the controller). The predictive load signal can be configured to include or provide information of the anticipated change in the load, such as one or more power characteristics. Responsive to receiving the predictive load signal, the AVR or the controller may extract the information of the anticipated change in the load from the predictive load signal. The AVR or the controller may analyze the extracted information to determine whether the anticipated change in the load (e.g., the load increase or load decrease) causes a transient deviation above a predetermined level in the output voltage of the genset. Responsive to the determination, the AVR or the controller may adjust the excitation current of the alternator prior to detecting the anticipated change in the load (e.g., prior to detecting a difference/error between a voltage setpoint and the output voltage). In some embodiments, the AVR or the controller may adjust the excitation current after detecting the beginning of the anticipated change in the load, but before the change causes the transient deviation above the predetermined level.

Referring to FIG. 1A, a block diagram illustrating a generator system 100 according to an exemplary embodiment is shown. In the illustrated embodiment, the generator system 100 (also referred to as a genset 102) includes an automatic voltage regulator (AVR) 104 and/or an exciter 108. In some embodiments, one or more components of the generator system 150, such as the AVR 104, can include one or more features described in connection with FIG. 1B. In some embodiments, the AVR 104 can be coupled to one or more loads 101 and/or the exciter 108. In some embodiments, at least one load 101 can be applied to (or removed from) the output of the genset 102. The application or removal of the at least one load 101 may cause a change in the load 101 of the genset 102. For instance, applying at least one load 101 to the output of the genset 102 may correspond to a load increase, while removing the load can correspond to a load decrease. Responsive to the load increase or decrease, the one or more loads 101 (e.g., load 101(1) and/or load 101(2)) may send, transmit or communicate a predictive load signal 106 to the AVR 104 of the genset 102. The AVR 104 may receive or obtain the predictive load signal 106 prior to detecting the load increase or decrease (e.g., an anticipated change in the load 101). For instance, the AVR 104 may receive the predictive load signal 106 prior to sensing a deviation in the output voltage of the genset 102, wherein the deviation is caused by a change in the load 101. The predictive load signal 106 may be related/associated with the anticipated change in the load 101. The predictive load signal 106 can be configured to include information of the anticipated change in the load (e.g., one or more power characteristics).

Responsive to receiving the predictive load signal 106, the AVR 104 may extract the information of the anticipated change in the load 101 from the predictive load signal 106. The AVR 104 may analyze or evaluate the extracted information to determine whether the anticipated change in the load 101 (e.g., the applied or removed load) causes a transient deviation above a predetermined level in the output voltage of the genset 102. The predetermined level may indicate or specify a maximum voltage deviation value from a rated/nominal voltage during a load change (e.g., a load increase or a load decrease). If the AVR 104 determines the anticipated change in the load 101 causes the transient deviation, the AVR 104 may adjust the excitation current of the genset 102 (e.g., the excitation current of the exciter 108). By adjusting the excitation current of the exciter 108, the AVR 104 can regulate, control, reduce or accommodate the transient deviation in the output voltage of the genset 102 (e.g., reduce the transient deviation). In some embodiments, the AVR 104 can sense or monitor the output voltage to detect changes in the load 101. In some embodiments, the AVR 104 can adjust the excitation current prior to sensing the transient deviation in the output voltage (e.g., caused by the change in the load 101).

Referring to FIG. 1B, a block diagram illustrating a generator system 150 according to an exemplary embodiment is shown. In the illustrated embodiment, the generator system 150 (also referred to as a genset 102) includes a generator 112, at least one controller 103 (or a control device), and an automatic voltage regulator (AVR) 104. In some embodiments, one or more components of the generator system 150, such as the AVR 104, can include one or more features described in connection with FIG. 1A. In some embodiments, the generator system 150 may include one or more generators 112. In some embodiments, a housing of the generator system 150 can include the generator(s) 112, the controller 103 and the AVR 104 (e.g., the same generator system 150 can include the generator 112, the controller 103, and the AVR 104). In some embodiments, the generator 112 can be separate and communicatively coupled to the controller 103 and the AVR 104, such that the controller 103 and the AVR 104 are separate from the generator system 150 (or genset 102). The generator 112 is configured to produce an electrical output. The electrical output can include a voltage (e.g., an output voltage of a genset 102) and/or a current, and is representative of a load 101 on the engine 120. For example, the electrical output can correspond to the engine power (e.g., power=voltage×current). In some embodiments, the generator 112 may include an engine 120 coupled to an alternator 122. In some embodiments, the generator 112 may include one or more engines 120 and alternators 122. The engine 120 may be any type of machine configured to convert energy, such as fuel, into mechanical energy (e.g., motion). The engine 120 may be an internal combustion engine (e.g., gasoline engine, natural gas engine, or diesel engine), a hybrid engine (e.g., a combination of an internal combustion engine and an electric motor), a high horse power engine (HHPE), and/or any other suitable engine.

The alternator 122 may be any type of machine configured to convert mechanical energy into electrical energy, such as an alternating current. In some embodiments, the alternator 122 includes a field winding, a rotor, and multiple poles. The field winding may be excited with a direct current (DC), also called an excitation current, in order to create a magnetic field and adjust the power factor and/or the output voltage of the generator system 150. The rotor may be driven by the engine 120 and thereby create electric power. In some embodiments, the generator 112 may include different and/or additional components than an engine 120 and alternator 122 (e.g., a hydraulically powered generator driven using hydraulic fluid). The generator system 150 may be a mastered or masterless system (e.g., a masterless load demand genset system or a mastered paralleled genset system, with a centralized system controller coordinating the generators 112 of the system 150, or a distributed system 150 control contained in the generators 112 of the system 150, respectively).

In some embodiments, an output of the generator 112 is connected to one or more loads 101. For instance, the output of the generator can be connected to a power grid. The power grid may be a local power grid (e.g., a power grid for a building, or multiple rooms) or a larger power grid that supports one or more cities, towns, or villages. In some embodiments, the power grid includes three phases. In this example, the generator 112 may include three outputs where each output is connected to one of the three phases. In alternative embodiments, the power grid (or other loads 101) may include one or more phases, and the generator 112 may include any number of outputs connected to the one or more phases.

The AVR 104 may include an input/output interface 140. The AVR 104 may also include various hardware components to implement the AVR 104 either with static electronics or dynamic moving parts. In some embodiments, the input/output interface 140 includes an electrical bus. The input/output interface 140 may include a first input terminal that is connected to the output of the generator 112 and that is configured to monitor the output characteristics of the generator 112. For instance, the first input terminal may be configured to monitor the output voltage of the alternator 122. In some embodiments, the first input terminal may be configured to receive or obtain a predictive load signal 106 (e.g., from one or more loads 101 and/or the generator 112, for instance). In one example, the AVR 104 may monitor the output voltage of the generator 112 (e.g., the alternator 122) to detect or identify a change in the load 101 (e.g., detecting a difference between a voltage setpoint and the output voltage). The voltage at the output of the generator 112 (e.g., the output voltage of the genset 102) may be affected by a change (e.g., an increase or decrease) in the load 101. For example, if a large industrial load is added to the output of the generator 112, the voltage of the output of the generator 112 will dip/decrease until the load 101 receives enough power (large inductive loads, such as large electric machinery or motors, can alter the power factor of the grid).

In some embodiments, the AVR 104 may control the engine 120 or alternator 122 in order to regulate the voltage on the output of the generator 112. For example, the AVR 104 may control, adjust or modify an excitation current of the alternator 122 prior to detecting a change in the load 101 (e.g., an increase or decrease in the load 101). By adjusting the excitation current, the AVR 104 can regulate/reduce transient deviations (e.g., caused by changes in the load 101) in the output voltage of the generator 112 (e.g., output voltage of the genset 102). In some embodiments, the AVR 104 can extract information of an anticipated change in the load 101 from a received predictive load signal 106 (e.g., received via the first input terminal). The AVR 104 may analyze the extracted information to determine whether to adjust the excitation current of the alternator 122. For instance, the AVR 104 may adjust the excitation current if the anticipated change in the load 101 causes a transient deviation above a predetermined level in the output voltage of the generator 112. Therefore, the AVR 104 may use the extracted information to control the engine 120 or the alternator 122.

In other embodiments, one or more first input terminals may be used by the AVR 104 to monitor or sense the voltage, power factor, power (e.g., reactive power), and/or current of the output of the generator 112. For instance, the one or more first input terminals can be used by the AVR 104 to monitor the output voltage of the generator 112. Responsive to the monitoring, the AVR 104 may detect or identify changes in the load 101 (e.g., a load increase or decrease). In some embodiments, the AVR 104 may include sensors to monitor the voltage (e.g., transient deviations in the voltage), power factor, power, and current on the output of the generator 112 (e.g., the output of the alternator 122). In some embodiments, the AVR 104 may receive via the one or more input terminals outputs from sensors that sense the voltage and current of the output of the generator 112. In some embodiments, the AVR 104 has a first priority to regulate the voltage on the output of the generator 112 (e.g., regulate or reduce transient deviations in the output voltage of the genset 102).

In some embodiments, the AVR 104 may monitor the line voltage between one or more outputs on the generator 112. The one or more outputs on the generator 112 may each be connected to a phase of the load 101. In some embodiments the AVR 104 may monitor the phase voltage (e.g., the phase to neutral voltage) between the one or more outputs of the generator 112 that are each connected to a phase of the load 101.

The input/output interface 140 may include a second input terminal that is connected to the controller 103. The second input terminal may be configured to receive a signal that indicates a voltage setpoint (e.g., a nominal/rated voltage) and/or a predetermined level of a transient deviation in the output voltage for the generator system 150. In this example, a signal (e.g., a signal from the controller 103) may indicate the voltage setpoint and/or the predetermined level of the transient deviation to the AVR 104. In some embodiments, the second input terminal of the input/output interface 140 can be configured to receive a signal (e.g., from the controller 103) that indicates an adjustment to the excitation current of the alternator 122. For instance, the controller 103 may determine or calculate an amount of current by which to adjust the excitation current (e.g., to regulate or reduce a transient deviation in the output voltage of the generator 112). The AVR 104 may receive the determined/calculated amount of current from the controller 103 via the second input terminal. It is to be appreciated that these examples are only some potential implementations, in other embodiments, other signals may be input via the second input terminal that indicate to the AVR 104 the voltage setpoint, the predetermined level, and/or the adjustment to the excitation current. In other embodiments, the AVR 104 may be integrated with the controller 103. In yet other embodiments, one or more second input terminals may be used by the AVR 104 in order to receive information regarding the voltage setpoint, the predetermined level, and/or the adjustment to the excitation current from the controller 103.

The input/output interface 140 may include a first output terminal that may be connected to the generator 112 in order to control the current (e.g., the excitation current) of the alternator 122. For example, in some embodiments, the first output terminal may be connected to a field winding of the alternator 122. The connection to the field winding may be used to induce or control a direct current into the field winding in order to control, adjust or regulate the output voltage of the genset 102. By controlling or adjusting the excitation current of the alternator 122, the AVR 104 may regulate or reduce transient deviations in the output voltage of the generator 112 (e.g., caused by changes to the load 101). In other embodiments, the AVR 104 may control or regulate the voltage of the output of the generator 112 via other facilitations or designs. In some embodiments, one or more first output terminals may be used by the AVR 104 to control the voltage of the output of the generator 112 (e.g., to reduce or decrease transient deviations caused by changes in the load 101). For example, the AVR 104 may utilize one or more first output terminals that are configured to signal to the generator 112 to spin faster, increase torque, or burn more fuel in order to regulate the voltage of the output of the generator 112 (e.g., to regulate transient deviations in the output voltage of the genset 102). In other embodiments, other methods or techniques may be used to regulate the voltage of the output of the generator 112.

The input/output interface 140 may include a second output terminal connected to the controller 103 and configured to provide the controller 103 with feedback regarding the output of the generator 112 (e.g., voltage, leading or lagging current, power factor, reactive current, etc.) or the state of the AVR 104. In some embodiments, one or more second output terminals may be connected to the controller 103 in order to provide the controller 103 with feedback. In some embodiments, the input/output interface 140 may be wired via a physical electrical connection to the other components. In some embodiments, the input/output interface 140 may be wired via a physical electrical connection to some components (e.g., to the generator 112) and wirelessly connected to some components (e.g., to the controller 103, or the sensors monitoring the output of the generator 112). In some embodiments, the input/output interface 140 is connected to all of the other components wirelessly. That is, it is to be appreciated that terms such as "terminal" are not meant to be limited to a physical terminal configured to be connected physically to another device or "terminal" unless expressly recited.

In some embodiments, the AVR 104 and/or the controller 103 may include a memory device (not depicted) that is configured to store machine-readable media. The machine readable media being readable by a processor (e.g., processor 130 or a processor of the AVR 104 (not depicted)) in order to execute the programs stored therein. The memory device (e.g., memory, memory unit, storage device) may include one or more devices (e.g., RAM, ROM, Flash memory, hard disk storage) for storing data and/or machine-readable media for completing or facilitating the various processes, layers and modules described in the present disclosure. The memory device may be communicatively coupled to a processor (e.g., processor 130) to provide computer code, machine-readable media, or instructions for executing at least some of the processes described herein. Moreover, the memory device may be or include tangible, non-transient volatile memory or non-volatile memory. Accordingly, the memory device may include database components, object code components, script components, or any other type of information structure for supporting the various activities and information structures described herein. In some embodiments, the memory device of the AVR 104 (or the controller 103) may include or store a table. The table may include one or more output voltage deviation values and/or one or more predetermined load change values. In some embodiments, the memory device of the controller 103 (or the AVR 104) can store or maintain the predetermined level of the transient deviation in the output voltage and/or the voltage setpoint.

The at least one controller 103 (or other control devices) may include a processor 130 and an input/output terminal 131. The processor 130 may include one or more processors or one or more processors that include multiple processing cores. The processor 130 may be implemented as a single- or multi-chip processor, a digital signal processor (DSP), an application specific integrated circuit (ASIC), a field programmable gate array (FPGA), or other programmable logic device, discrete gate or transistor logic, discrete hardware components, or any combination thereof designed to perform the functions described herein. A processor 130 may be a microprocessor or any conventional processor, or state machine. A processor 130 may be implemented as a combination of computing devices, such as a combination of a DSP and a microprocessor, a plurality of microprocessors, one or more microprocessors in conjunction with a DSP core, or any other such configuration. In some embodiments, the one or more processors 130 may be shared by multiple circuits (e.g., one or more circuits may share the same processor 130 which, in some example embodiments, may execute instructions stored, or otherwise accessed, via different areas of memory). Alternatively or additionally, the one or more processors 130 may be structured to perform or otherwise execute certain operations independent of one or more co-processors. In other example embodiments, two or more processors 130 may be coupled via a bus to enable independent, parallel, pipelined, or multi-threaded instruction execution. All such variations are intended to fall within the scope of the present disclosure.

In some embodiments, the controller 103 can be coupled to the engine 120, the alternator 122, the AVR 104, and/or other components of the generator system 150 via the input/output interface 131. The input/output interface 131 may include one or more terminals configured to connect to the AVR 104 or the generator 112. For example, as discussed above, a first output terminal of the input/output interface 131 may be connected to the second input terminal of the AVR 104 in order to signal to the AVR 104 the voltage setpoint, the predetermined level, the adjustment to the excitation current, and/or other information. Additionally, as discussed above, the input/output interface 131 may include a first input terminal configured to connect to the second output terminal of the AVR 104 in order to receive feedback or other information (e.g., an output voltage of the generator 112) from the AVR 104. The first input terminal and the first output terminal of the input/output interface 131 may be embodied as one or more physical contacts or as a combination of physical electrical contacts and wireless terminals.

In some embodiments, the input/output interface 131 may also include a second input terminal that may be connected to one or more sensors (not depicted) that measure the voltage, power factor, power, and current of the output of the generator 112. In some embodiments, the controller 103 may receive information regarding the voltage, power factor, power, and current of the output of the generator 112 directly from the sensors monitoring the output. In some embodiments, the controller 103 may receive the information regarding the voltage, power factor, power, and current of the output of the generator 112, as well as the predictive load signal 106, from the AVR 104. In some embodiments, the controller 103 may receive information regarding the voltage, power factor, power, and current of the output of the generator 112 from multiples sources (e.g., the AVR 104 and the sensors). The second input terminal may be embodied as one or more physical contacts or a combination of physical electrical contacts on a bus and wireless terminals. In some embodiments, the AVR 104 and the controller 103 may be integrated into one device and the communication may be more direct. Additionally or alternatively, the controller 103 may be connected to the generator 112 in a similar manner as the AVR 104 such that the controller 103 may perform the functions as described in reference to the AVR 104.

In some embodiments, the controller 103 (or other control devices) may be configured to receive or obtain a predictive load signal 106 from the load 101 and/or the AVR 104. The controller 103 may receive the predictive load signal 106 via the input/output interface 131. In some embodiments, the controller 103 may extract the information of an anticipated change in the load 101 (e.g., one or more power characteristics of the anticipated change in the load 101) from the received predictive load signal 106. Responsive to extracting the information, the controller 103 may analyze or evaluate whether the anticipated change in the load 101 causes a transient deviation above a predetermined level (e.g., stored in the memory device) in the output voltage of the generator 112. If the change in the load 101 causes the transient deviation, the controller 103 may calculate or determine an adjustment to the excitation current of the alternator 122. For instance, if an increase in the load 101 causes a transient decrease above the predetermined level in the output voltage, the controller 103 may determine/calculate an amount by which to increase the excitation current of the alternator 122 (e.g., to regulate/decrease the transient deviation). The controller 103 may send, transmit or communicate the determined amount of current to the AVR 104 via the input/output interface 131. The AVR 104 may receive the adjustment to the excitation current via the input/output interface 140. Responsive to receiving the adjustment, the AVR 104 may use the calculated adjustment to modify the excitation current of the alternator 122 (e.g., prior to detecting a difference between a voltage setpoint and the output voltage).

Figure 2:
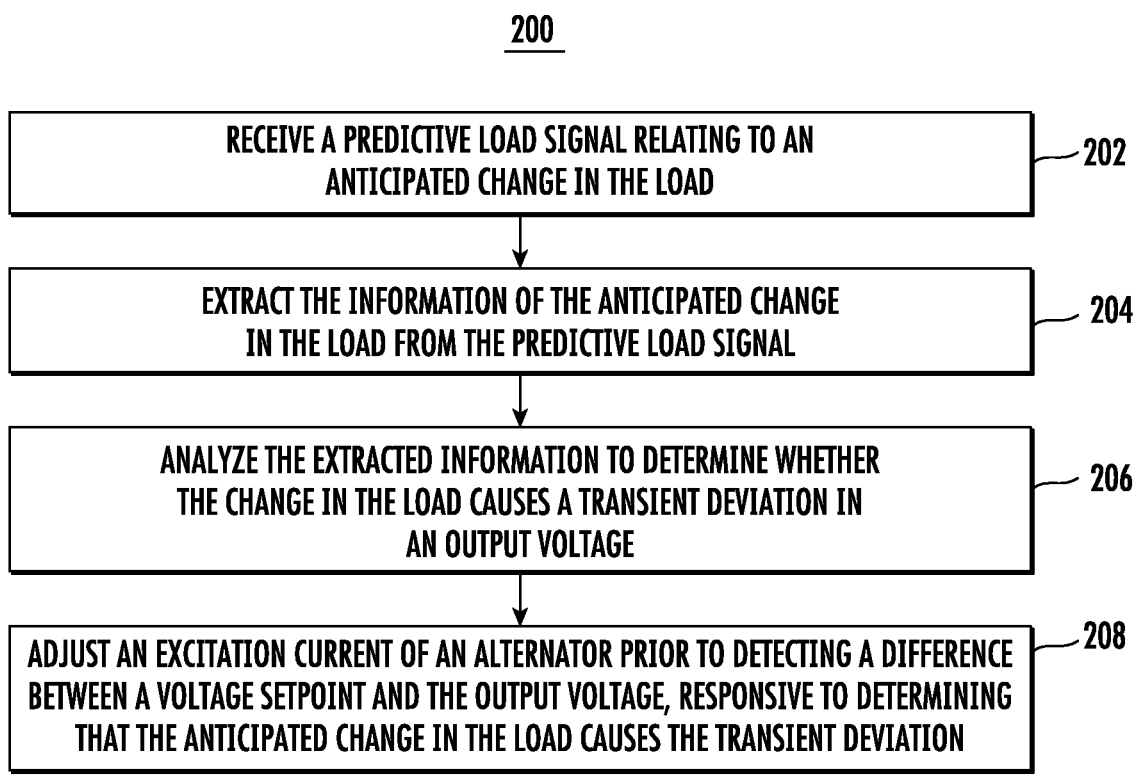
FIG. 2 is a flow diagram of a method for regulating transient deviations in an output voltage of a genset or power generator system, according to an exemplary embodiment.

FIG. 2 illustrates a flow diagram of a method 200 for regulating a transient voltage of a genset 102, according to an exemplary embodiment. The method 200 may be implemented using any of the components and devices detailed herein in conjunction with FIGS. 1A and 1B. In overview, the method 200 may include receiving a predictive load signal 106 relating to an anticipated change in one or more loads 101 (202). The method 200 may include extracting the information of the anticipated change in the one or more loads 101 from the predictive load signal 106 (204). The method 200 may include analyzing the extracted information to determine whether the change in the one or more loads 101 causes a transient deviation in an output voltage (206). The method 200 may include adjusting an excitation current of an alternator 122 prior to detecting a difference between a voltage setpoint and the output voltage (208).

Referring now to operation 202, and in some embodiments, the method 200 may include receiving a predictive load signal 106. For instance, an AVR 104 (or a control device, such as a controller 103, of an AVR 104) may receive or obtain the predictive load signal 106 (e.g., a temperature trigger signal or other signals) from one or more loads 101 (e.g., an air conditioner or other loads). The one or more loads 101 (e.g., load 101(1) and/or load 101(2)) may send or transmit the predictive load signal 106 to the AVR 104 via the alternator 122 (or other components of the generator system 100 or 150, such as the controller 103). In some embodiments, the one or more loads 101 may send or communicate the predictive load signal 106 responsive to a change (e.g., an anticipated change) in load 101. For instance, the one or more loads 101 can transmit the predictive load signal 106 to the AVR 104 (or other components of the generator system 100 or 150) responsive to a load increase (or decrease) at the output of a generator 112. In some embodiments, the AVR 104 can receive the predictive load signal 106 in a manual manner. For instance, an operator of a generator system 100 or 150 can manually enable (or turn on) a power switch between a load 101 and an alternator 122. Responsive to enabling the power switch, the AVR 104 can receive the predictive load signal 106 from the load 101 (or other components of the generator system 100 or 150). The AVR 104 can receive or obtain the predictive load signal 106 (e.g., from the load(s) 101) via the input/output interface 140 of the AVR 104. In some embodiments, the controller 103 (or other control devices) may receive the predictive load signal 106 via the input/output interface 131 of the controller 103.

In some embodiments, the predictive load signal 106 may be related or associated to an anticipated change in the load 101. For instance, a predictive load signal 106 (e.g., a circuit breaker trip command) may indicate or specify an anticipated change in the load 101. The anticipated change in the load(s) 101 may refer to a change in the load (e.g., load increase or load decrease) that is anticipated by at least one component of the generator system 100 or 150 prior to detecting or identifying the change in the load. For example, the AVR 104 may anticipate a change in the load 101 (e.g., based on a received predictive load signal 106) prior to detecting or identifying a difference between a voltage setpoint and the output voltage of the genset 102. In some embodiments, the predictive load signal 106 may be configured to include, specify and/or provide information of the anticipated change in the load 101. The information of the anticipated change in the load 101 can include one or more power characteristics of the anticipated change in the load 101. The one or more power characteristics may include a power numerical, a power factor, an inductance, a capacitance, and/or other power characteristics of the load 101 (or change in the load 101).

In some embodiments, the AVR 104 may store or maintain one or more power characteristics of an anticipated load change (e.g., the one or more power characteristics can be preset in the AVR 104). If one or more power characteristics are stored in the AVR 104, the AVR 104 (or other components of the generator system 100 or 150, such as a controller 103) may compare a received predictive load signal 106 (e.g., the information of the anticipated change in the load 101) to the stored power characteristic(s). Responsive to the comparison, the AVR 104 may determine whether the predictive load signal 106 (e.g., a discrete switch) indicates that the anticipated change in the load 101 causes a transient deviation above a predetermined level in an output voltage of a genset 102. In some embodiments, the predictive load signal 106 may include a datalink signal (e.g., controller area network (CAN) bus), a circuit breaker trip command, a temperature trigger signal, an analog voltage input, a discrete switch input, and/or other types of signals or commands.

Referring now to operation 204, and in some embodiments, the method 200 may include extracting or obtaining the information of the anticipated change in the load(s) 101. For example, the AVR 104 (or other components of the generator system 100 or 150, such as the controller 103) may extract the information of the anticipated change in the load 101 from the predictive load signal 106. In some embodiments, the AVR 104 may extract or obtain the information of the anticipated change in the load 101 responsive to receiving the predictive load signal 106. For instance, the load(s) 101 may send or communicate a datalink signal (or other predictive load signals) to the AVR 104 (or other components of the generator system 100 or 150) responsive to an increase (or decrease) in the load(s) 101. Responsive to receiving the predictive load signal 106, the AVR 104 may extract one or more power characteristics (e.g., a power numerical) of the anticipated change in the load(s) 101 (e.g., increase or decrease in the load(s)) from the received predictive load signal 106. In some embodiments, the AVR 104 may extract the information of the anticipated change in the load 101 within a predefined time interval (e.g., 40 ms, 60 ms, or other time intervals). The predefined time interval may include or correspond to an interval of time between receiving the predictive load signal 106 and detecting a difference between the voltage setpoint (e.g., a nominal output voltage of a genset 102) and the output voltage (e.g., detecting a change in the load(s) 101). Once the AVR 104 extracts or obtains the information of the anticipated change in the load 101 (e.g., from the predictive load signal 106), the AVR 104 may use the extracted information to determine whether the anticipated change in the load 101 causes a transient deviation (e.g., a transient deviation above a predetermined level) in an output voltage of the generator system 100 or 150 (e.g., a genset 102).

Referring now to operation 206, and in some embodiments, the method 200 may include analyzing the extracted information (e.g., information of the anticipated change in the load 101). For example, the AVR 104 (or other components of the generator system 100 or 150, such as the controller 103) may analyze or evaluate the information extracted from the received predictive load signal 106 (e.g., one or more power characteristics of the anticipated change in the load 101). By analyzing the extracted information, the AVR 104 may determine whether the anticipated change in the load 101 causes or produces a transient deviation above a predetermined level (e.g., a voltage threshold) in an output voltage of the genset 102. For instance, prior to detecting a change in the load(s) 101 (e.g., an increase or decrease in the load(s) 101), the AVR 104 (or the controller 103) may receive or obtain a predictive load signal 106 from the load(s) 101 (or other components of the generator system 100 or 150). Upon receiving the predictive load signal 106, the AVR 104 may extract one or more power characteristics of the anticipated change in the load(s) 101 from the predictive load signal 106. The AVR 104 may analyze the extracted power characteristic(s) (or other information) to determine whether the anticipated change in the load(s) 101 causes a transient deviation above a predetermined level in the output voltage of a genset 102. The predetermined level may indicate or specify a voltage deviation value from a rated/nominal voltage during a load change (e.g., a load increase or a load decrease). For instance, the predetermined level may include or correspond to a 15% (or other percentage values) voltage deviation from the rated voltage during a change in the load 101. In this example, the AVR 104 may determine the anticipated change in the load 101 causes a transient deviation in the output voltage if the anticipated load change triggers a 15% (or other percentage values) voltage deviation from the nominal voltage value. If the anticipated change in the load 101 causes a transient voltage deviation from the nominal voltage value that is below 15% (or other predetermined levels), the AVR 104 may determine the anticipated change in the load 101 fails to cause a transient deviation above the predetermined level.

In some embodiments, one or more predetermined levels may be defined according to (or based) a performance class (e.g., G1, G2, G3, and/or G4) of the generator system 100 or 150. For example, the predetermined level(s) for a first performance class may include or correspond to a 25% (or other percentage values) voltage deviation from the rated voltage during a change in the load 101. In the same example, the predetermined level(s) for a second performance class may include or correspond to a 35% (or other percentage values) voltage deviation from the rated voltage during a change in the load 101. The predetermined level(s) for a performance class can be defined according to predetermined standards and/or a type of application (e.g., the generator system 100 or 150 is used in a datacenter). In some embodiments, a plurality of predetermined levels can be defined according to a type of load change (e.g., a load increase and/or a load decrease). For example, for the first performance class, the predetermined level for a load increase may include or correspond to a 25% voltage deviation (or other percentage values), while the predetermined level for a load decrease may correspond to a 35% voltage deviation (or other percentage values).

In some embodiments, the AVR 104 (or other components of the generator system 100 or 150, such as the controller 103) may determine or calculate an adjustment or modification to the excitation current of the alternator 122. For example, responsive to determining the anticipated change in the load 101 causes a transient deviation above a predetermined level, the AVR 104 may calculate, configure, or determine an adjustment to the excitation current of the alternator 122. The AVR 104 may use the information extracted from the predictive load signal 106 (e.g., one or more power characteristics of the anticipated change in the load 101) to determine or calculate the adjustment to the excitation current of the alternator 122. For instance, the information extracted from the predictive load signal 106 may indicate, provide, or specify one or more power characteristics of a load increase (or load decrease). The AVR 104 may analyze the power characteristic(s) of the load increase/decrease to determine whether the load increase/decrease causes a transient deviation above the predetermined level. Responsive to determining the load increase/decrease causes the transient deviation (e.g., above the predetermined level), the AVR 104 may use the extracted power characteristic(s) (or other information) to determine an adjustment to the excitation current of the alternator 122 (e.g., determine to increase or decrease the excitation current of the alternator 122 by a calculated quantity/amount).

In some embodiments, the AVR 104 (or controller 103) may determine to increase the excitation current (e.g., intensify the generator's magnetic field) by a calculated/determined quantity/amount (e.g., based on the extracted power characteristic(s)) if the power characteristic(s) correspond to (or indicate) a load increase. If the power characteristic(s) correspond to a load decrease, the AVR 104 (or controller 103) may determine to decrease the excitation current (e.g., reduce the intensity of the generator's magnetic field) by a calculated/determined quantity/amount (e.g., based on the extracted power characteristic(s)). The AVR 104 (or controller 103) may send, transmit, or communicate a control signal (e.g., a pulse width modulation (PWM) signal or other types of signals) to the alternator 122 (e.g., exciter rotor & stator 402). The control signal from the AVR 104 to the alternator 122 may control/adjust/modify the excitation current of the alternator 122. For instance, the AVR 104 may send the control signal to the alternator 122 responsive to determining/calculating an adjustment to the excitation current of the alternator 122. The control signal may specify, provide, or indicate the adjustment to the excitation current (e.g., an increase or decrease to the excitation current by a certain amount).

In some embodiments, analyzing the extracted information may include storing a table with output voltage deviation values and/or predetermined load change values. For example, the AVR 104 (or other components of the generator system 100 or 150) may store or maintain at least one table. The table may include one or more output voltage deviation values and/or one or more predetermined load change values. In some embodiments, the one or more output voltage deviation values (e.g., output voltage deviation values of a genset 102) may be associated with (or related to) the one or more predetermined load change values (e.g., values of a predetermined change in load 101 of a genset 102). For instance, a load 101 of a genset 102 can be increased (e.g., during a transient test) using load increments of at least 5% (or other percentage values) of a rated/nominal power. The at least 5% load increase values (e.g., the predetermined load change values) may be stored in a table of the AVR 104. For each load increase value, a corresponding value of output voltage deviation (e.g., caused by the 5% load increase) may be stored in the table of the AVR 104. Therefore, the one or more predetermined load change values (e.g., the at least 5% load increase values) may be associated/related with the one or more output voltage deviation values.

In some embodiments, the AVR 104 (or the controller 103) can use the table to determine/identify whether an anticipated change in the load 101 of a genset 102 causes/triggers a transient deviation in the output voltage that is above a predetermined level. For example, the AVR 104 may compare/analyze the information of the anticipated change in the load 101 (e.g., one or power characteristics) to the predetermined load change values stored in the table. The AVR 104 may determine whether the value of the anticipated change in the load 101 corresponds to at least one of the stored predetermined load change values. If the anticipated change in the load 101 corresponds to at least one predetermined load change value, the AVR 104 may determine/identify the output voltage deviation value (e.g., stored in the table) associated to the at least one predetermined load change value. The AVR 104 may determine the anticipated change in the load 101 causes a transient output voltage deviation corresponding to the identified output voltage deviation value (e.g., associated to the at least one predetermined load change value corresponding to the anticipated change in the load 101) stored in the table. In some embodiments, the AVR 104 (or the controller 103) may compare/analyze the information of the anticipated change in the load 101 to the output voltage deviation values stored in the table. For example, the AVR 104 may compare at least one of the power characteristics of the anticipated change in the load 101 to the stored output voltage deviation values.

Responsive to comparing the information of the anticipated change in the load 101 (e.g., comparing to the output voltage deviation values and/or the predetermined load change values stored in the table), the AVR 104 (or other components of the generator system 100 or 150) may determine whether the anticipated change in the load 101 causes a transient deviation above the predetermined level in the output voltage. In the previous example, the AVR 104 may determine the anticipated change in the load 101 causes a transient output voltage deviation corresponding to an output voltage deviation value stored in the table. The output voltage deviation value of the table may be associated to at least one predetermined load change value (e.g., stored in the table) corresponding to the anticipated change in the load 101. Responsive to determining the anticipated change in the load 101 causes a transient deviation in the output voltage, the AVR 104 may determine whether the caused transient deviation is above a predetermined level (e.g., a voltage deviation of at least 15% of a nominal voltage value). If the AVR 104 determines the caused transient deviation is above the predetermined level, the AVR 104 (or controller 103) may adjust or modify an excitation current of the alternator 122.

Referring now to operation 208, and in some embodiments, the method 200 may include adjusting (e.g., increasing or decreasing) an excitation current of an alternator 122. For instance, the AVR 104 (or other components of the generator system 100 or 150, such as a controller 103) may adjust or modify the excitation current of the alternator 122. In some embodiments, the AVR 104 may adjust the excitation current prior to detecting/identifying a difference between a voltage setpoint and the output voltage (e.g., before the anticipated change in the load 101 affects the alternator 122). By adjusting the excitation current prior to detecting/identifying the difference, the AVR 104 may prevent the anticipated load change from causing a transient output voltage deviation above the predetermined level. Therefore, adjusting the excitation current prior to detecting/ identifying the difference may accommodate the anticipated change in the load 101 by reducing/decreasing the transient output voltage deviation caused by the anticipated change in the load 101. In some embodiments, the AVR 104 may adjust (e.g., increase or decrease) the excitation current responsive to determining that the anticipated change in the load 101 causes a transient output voltage deviation above the predetermined level. In some embodiments, the AVR 104 (or the controller 103) may adjust or modify the excitation current within a predefined interval. The predefined interval may include or correspond to an interval of time between receiving the predictive load signal 106 and detecting the difference between the voltage setpoint and the output voltage (e.g., before the anticipated change in the load 101 affects the alternator 122).

In some embodiments, the AVR 104 (or the controller 103) may adjust the excitation current of the alternator 122 according to one or more values stored in a table. The table can be stored in a memory storage of the AVR 104 or other components of the generator system 100 or 150 (or genset 102). The value(s) stored in the table may include one or more output voltage deviation values and/or one or more predetermined load change values. In one example, the AVR 104 may determine the anticipated change in the load 101 causes a transient deviation above the predetermined level in the output voltage of the genset 102. Responsive to the determination, the AVR 104 may adjust or modify the excitation current according to the stored (e.g., in the table) output voltage deviation values. For instance, the AVR 104 may determine the anticipated change in the load 101 causes a transient voltage deviation corresponding to at least one of the stored output voltage deviation values. According to the determination, the AVR 104 may adjust the excitation current of the alternator 122 to regulate or reduce the transient voltage deviation caused by the anticipated change in the load 101.

In some embodiments, the AVR 104 (or other components of the generator system 100 or 150) may modify or adjust the excitation current of the alternator 122 back to a nominal current value (e.g., a value of excitation current prior to detecting a difference between a voltage setpoint and the output voltage). For instance, the AVR 104 can modify the excitation current back to a nominal current value responsive to adjusting the excitation current to prevent the anticipated load change from causing a transient output voltage deviation above the predetermined level. In some embodiments, the AVR 104 may modify the excitation current back to a nominal current value after a period of time. The period of time can be predetermined or preconfigured. In some embodiments, the AVR 104 may determine or calculate the period of time based on one or more characteristics of the output voltage deviation (e.g., based on a recovery time). In some embodiments, maintaining the excitation current at the adjusted value for the period of time can regulate/decrease the output voltage deviation caused by the anticipated change in the load 101. In some embodiments, the AVR 104 (or the controller 103) may adjust the excitation current to regulate the transient deviation in the output voltage to a voltage value that is up to 20% (or other percentage values) of a nominal voltage value. For instance, the AVR 104 may adjust the excitation current to prevent the transient output voltage deviation (e.g., caused by the anticipated change in the load 101) from exceeding a 20% (or other percentages) voltage deviation from a nominal/rated output voltage.

In some embodiments, the AVR 104 (or other components of the generator system 100 or 150) can maintain the excitation current as a nominal current value. For instance, the AVR 104 may analyze the information (e.g., one or more power characteristics of the anticipated change in the load 101) extracted from the predictive load signal 106. Responsive to analyzing the extracted information, the AVR 104 may determine the anticipated change in the load 101 fails to cause a transient deviation above the predetermined level in an output voltage of the genset 102. Therefore, the AVR 104 (or the controller 103) may determine to maintain the excitation current at the nominal current value (e.g., an excitation current value associated with a nominal/rated output voltage).

Figure 3A:
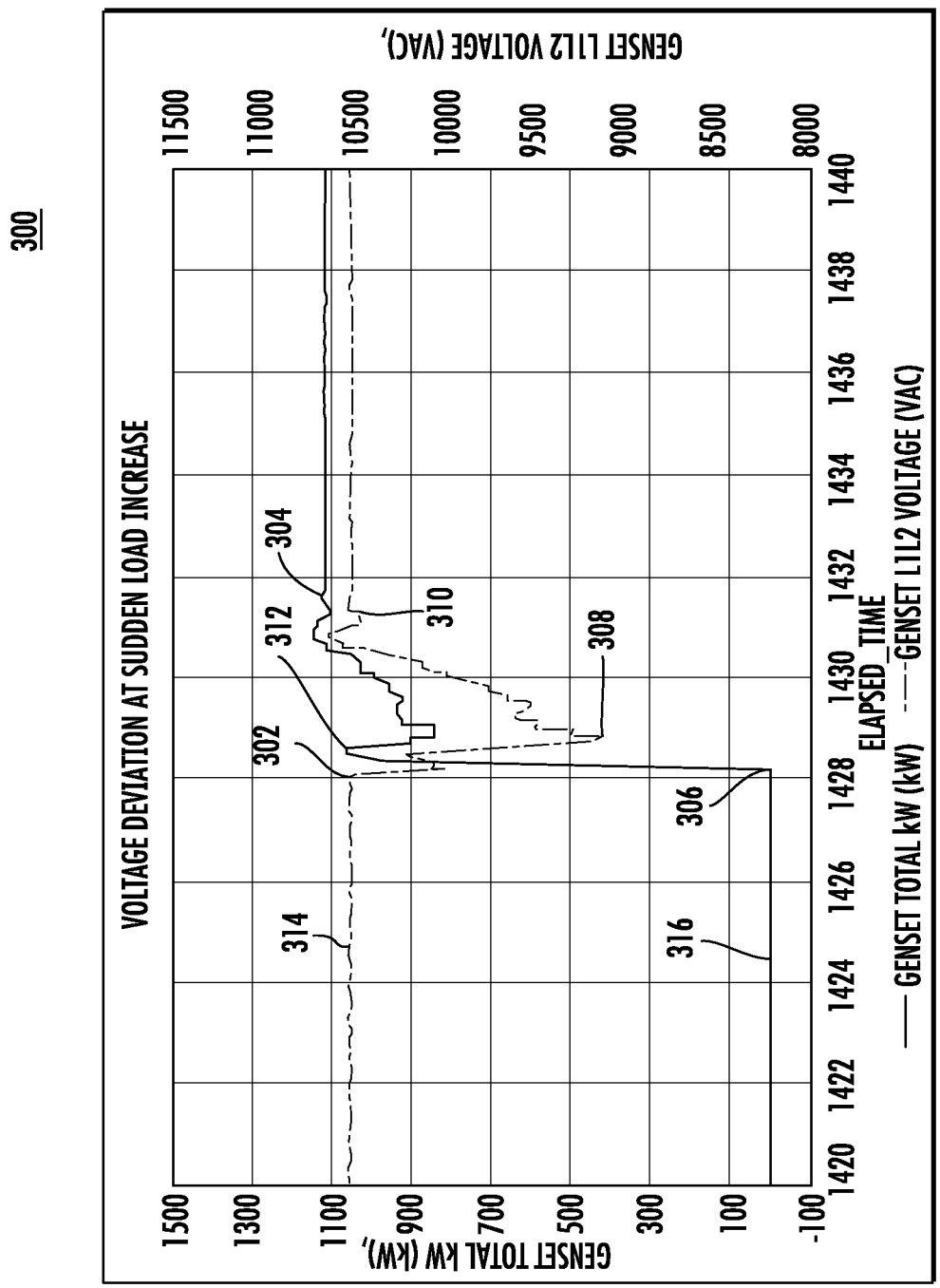
FIG. 3A is a graph illustrating the total power and voltage of a genset during an increase in the load of the genset, according to an exemplary embodiment.

FIG. 3A illustrates a graph 300 of the total power and voltage (e.g., the line voltage L1 and L2) of a genset 102 (e.g., a generator system 100 or 150) during an increase in the load 101 of the genset 102, according to an exemplary embodiment. The graph 300 includes two y-axes indicating the total power (e.g., total output power) of the genset 102 (in units of kW) and the voltage (L1L2 voltage) of the genset 102 (in units of VAC). The graph 300 includes an x-axis indicating the elapsed time (in units of seconds). In some embodiments, the genset 102 may operate under stabilized/nominal conditions (e.g., the genset 102 can operate without changes to the load 101). For instance, point 314 and/or point 316 of graph 300 indicate the voltage and/or total power of the genset 102 under nominal conditions. A genset 102 that is operating under nominal conditions may provide a nominal voltage (e.g., point 314) and/or a total power (e.g., point 316) to one or more loads 101. In some embodiments, the load 101 of the genset 102 may increase (e.g., a load is applied to the output of the genset 102). For example, point 306 of graph 300 indicates a sudden increase in the total power of the genset 102. The sudden increase in the total power of the genset 102 (e.g., point 306) may correspond to (or be associated with) an increase in the load 101 of the genset 102. Responsive to the load increase, the amount of current provided to the load 101 by the genset 102 may increase (e.g., an increase in the output current of the generator 112). For instance, a load 101 that is applied to a genset 102 may draw an increased amount of current from the genset 102.

In some embodiments, the increased amount of current provided to the load 101 (e.g., by the genset 102) may cause a drop/decrease in the voltage of the genset 102 (e.g., point 302 to point 308). For instance, the load increase (e.g., point 306 to point 312) may cause a decrease in the voltage of the genset 102 from a nominal voltage (e.g., point 302) to a minimum voltage (e.g., point 308). The variation in the voltage of the genset 102 (e.g., the voltage difference between point 308 and 302, caused by the load increase) may be referred to as the dip and/or the transient deviation in the output voltage. The systems and methods presented herein include a novel approach for reducing/regulating said transient deviation in the output voltage. Responsive to the drop/decrease in the voltage, the genset 102 may normalize/stabilize the voltage (e.g., using closed-loop feedback control) back to the nominal voltage value (e.g., point 310). Once the load 101 of the genset 102 is stable (e.g., point 304), the genset 102 may operate under nominal conditions (e.g., point 310).

Figure 3B:
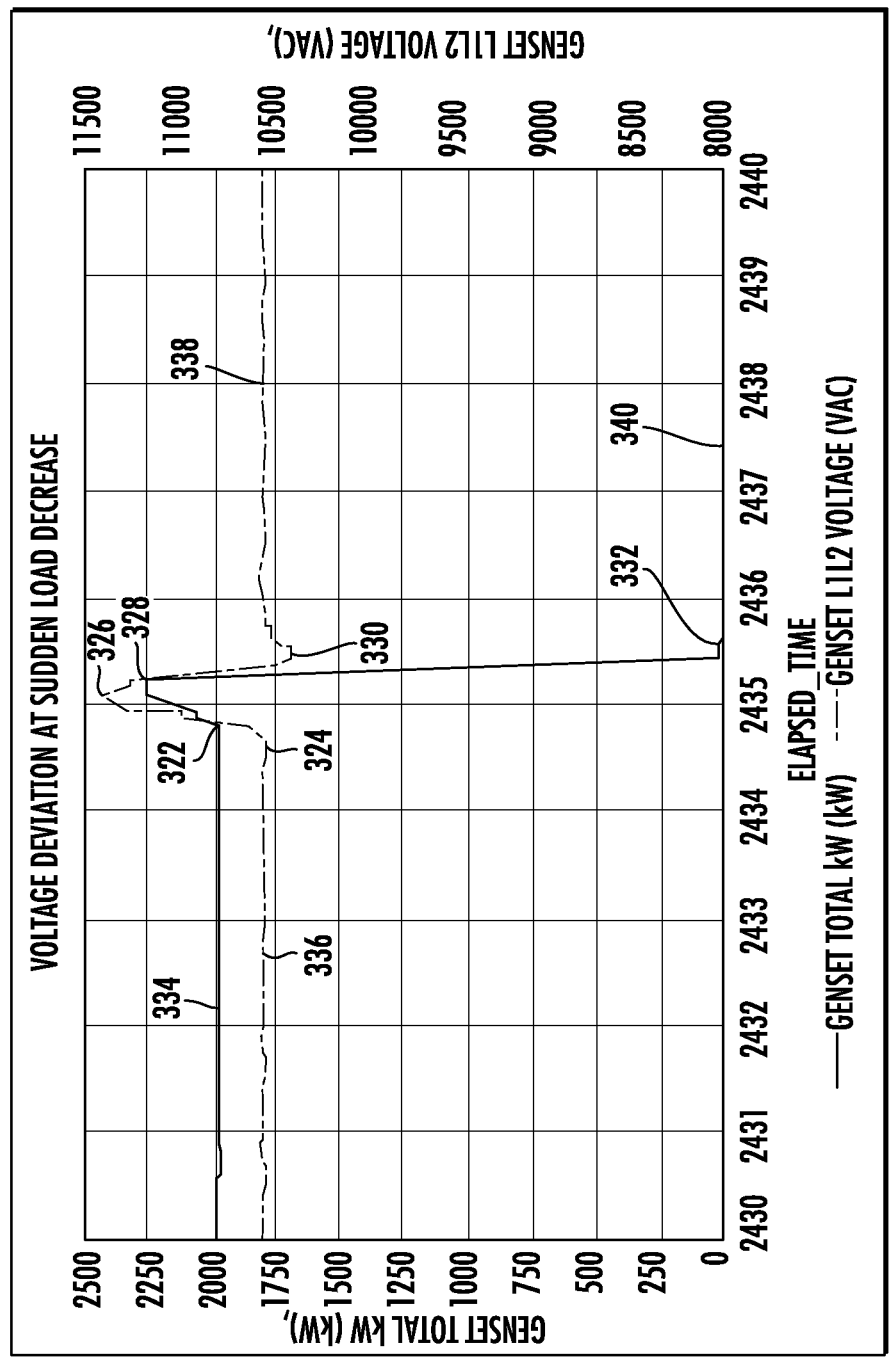
FIG. 3B is a graph illustrating the total power and voltage of a genset during a decrease in the load of the genset, according to an exemplary embodiment.

FIG. 3B illustrates a graph 350 of the total power and voltage of a genset 102 during a decrease in the load 101 of the genset 102, according to an exemplary embodiment. As in FIG. 3A, the graph 350 includes two y-axes indicating the total power of the genset 102 (in units of kW) and the voltage (L1L2 voltage) of the genset 102 (in units of VAC). The graph 350 includes an x-axis indicating the elapsed time (in units of seconds). In some embodiments, the genset 102 may operate under stabilized/nominal conditions (e.g., the genset 102 can operate without changes to the load 101). For instance, point 334 and/or point 336 of graph 350 indicate the total power and/or voltage of the genset 102 under nominal conditions. A genset 102 that is operating under nominal conditions may provide a nominal voltage (e.g., point 336) and/or a total power (e.g., point 334) to one or more loads 101. In some embodiments, the load 101 of the genset 102 may decrease (e.g., a load is removed from the output of the genset 102). For example, point 328 to point 332 of graph 350 indicate a sudden decrease in the total power of the genset 102. The sudden decrease in the total power of the genset 102 may correspond to (or be associated with) a decrease in the load 101 of the genset 102. Responsive to the load decrease, the amount of current provided by the genset 102 may decrease (e.g., a decrease in the output current of the generator 112). For instance, a load 101 that is removed from the genset 102 may cause a decrease in the amount of current provided by the genset 102.

In some embodiments, the decreased amount of current provided by the genset 102 may cause a rise/increase in the voltage of the genset 102 (e.g., point 324 to point 326). For instance, the load decrease (e.g., point 322 to point 332) may cause an increase in the voltage of the genset 102 from a nominal voltage (e.g., point 324) to a maximum voltage (e.g., point 326). The variation in the voltage of the genset 102 (e.g., the voltage difference between point 326 and 324, caused by the load decrease) may be referred to as the rise and/or the transient deviation in the output voltage. The systems and methods presented herein include a novel approach for reducing/regulating said transient deviation in the output voltage. Responsive to the rise/increase in the voltage, the genset 102 may normalize/stabilize the voltage (e.g., using closed-loop feedback control) back to the nominal voltage value (e.g., point 338). Once the load 101 of the genset 102 is stable (e.g., point 340), the genset 102 may operate under nominal conditions (e.g., point 338).

Figure 4:
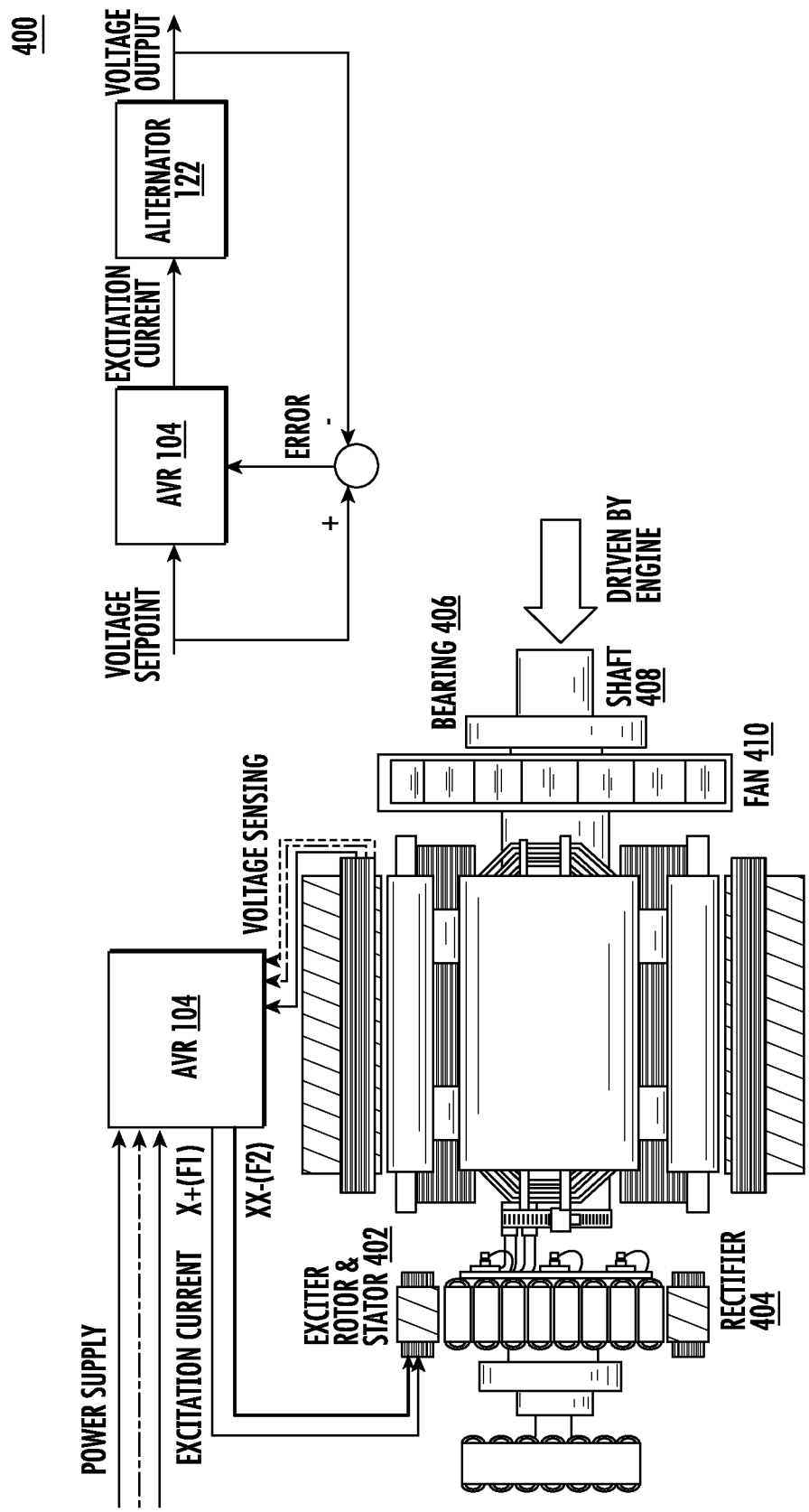
FIGS. 4-5 are block diagrams illustrating an automatic voltage regulator and an alternator of a genset, according to an exemplary embodiment.

FIG. 4 illustrates a block diagram 400 of an AVR 104 and an alternator 122 of a genset 102 (e.g., a generator system 100 or 150), according to an exemplary embodiment. In some embodiments, the AVR 104 may receive, obtain, or access an output voltage of the alternator 122 (e.g., a sensed line voltage from one or more terminal outputs of the alternator 122), a voltage setpoint (e.g., a reference voltage provided by a controller 103), and/or a difference between a voltage setpoint and the output voltage (e.g., an error). The AVR 104 may receive the output voltage of the alternator 122, the voltage setpoint, and/or other information via the input/output interface 140. In some embodiments, the AVR 104 may provide/generate/configure a PWM signal (or other types of signals) to control/adjust/modify/regulate the excitation current of the alternator 122. For instance, the AVR 104 may provide a PWM signal to control/adjust the voltage of the exciter stator. By controlling/adjusting the voltage of the exciter stator, the AVR 104 can adjust/modify/control/regulate the amount of current in the main rotor (e.g., the excitation current of the alternator 122). The AVR 104 may regulate/adjust the current of the main rotor to adjust, control or regulate the intensity of the magnetic field of the generator 112. In some embodiments, an increase in the load 101 of the genset 102 may cause an increase in the intensity of the magnetic field of the generator 112. Alternatively, a decrease in the load 101 of the genset 102 may cause a decrease in the intensity of the magnetic field of the generator 112.

In some embodiments, the AVR 104 may sense, determine, calculate, receive, or identify an error/difference between a voltage setpoint (e.g., a nominal voltage provided by the controller 103) and the output voltage of the alternator 122. The difference between the voltage setpoint and the output voltage of the alternator 122 may include or correspond to a transient deviation in the output voltage of the genset 102. The difference/error between said voltages can be caused by a change in the load 101 of the genset 102 (e.g., an increase/decrease in the load 101). For instance, an increase in the load 101 of the genset 102 may cause a decrease/drop in the output voltage (e.g., a transient deviation in the output voltage of the genset 102). Responsive to detecting the difference between the voltage setpoint and the output voltage of the alternator 122, the AVR 104 may adjust/modify/regulate/control the excitation current of the alternator 122 (e.g., via closed-loop feedback control). For instance, responsive to detecting the increase in the load of the genset 102, the AVR 104 may increase the excitation current of the alternator 122 (e.g., by modifying the voltage of the exciter stator). By adjusting the excitation current of the alternator 122, the AVR 104 may regulate the output voltage of the alternator 122 (e.g., back to a nominal voltage or the voltage setpoint). In the previous example, increasing the excitation current of the alternator 122 (e.g., responsive to detecting an increase in the load 101) may cause an increase in the output voltage of the alternator 122 (e.g., regulating/modifying the output voltage back to a nominal voltage value).

Figure 5:
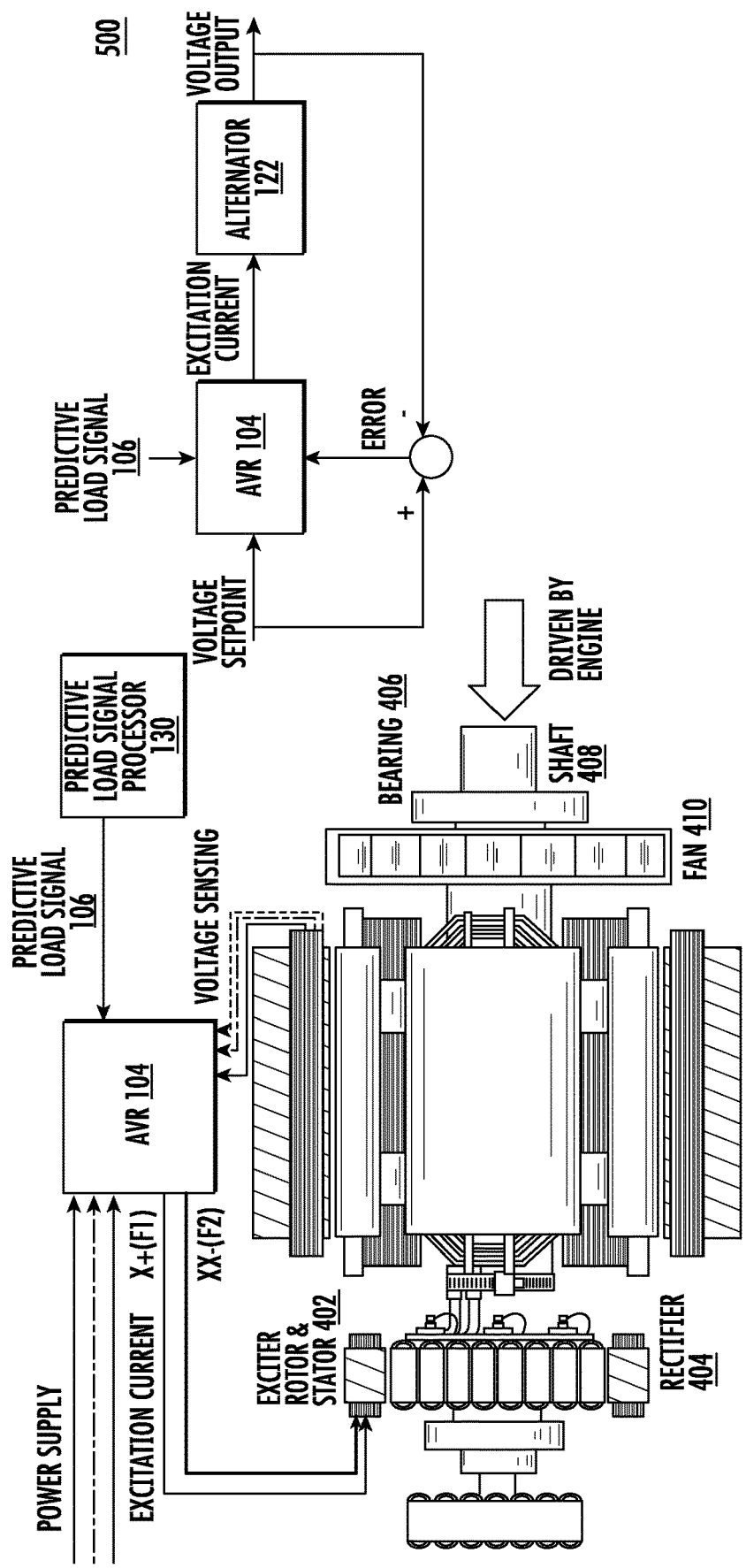

FIG. 5 illustrates a block diagram 500 of an AVR 104 and an alternator 122 of a genset 102 (e.g., a generator system 100 or 150), according to an exemplary embodiment. The AVR 104 and/or alternator 122 may each include one or more features described in connection with FIG. 4. In some embodiments, the AVR 104 may receive, obtain, or access an output voltage of the alternator 122, a voltage setpoint, a difference between a voltage setpoint and the output voltage, and/or a predictive load signal 106. For instance, the AVR 104 may receive/obtain the predictive load signal 106 from one or more loads 101. A predictive load signal processor 130 (e.g., included in a load 101 and/or other components of the genset 102) may generate or configure the predictive load signal 106. The load(s) 101 may send the predictive load signal 106 to the AVR 104 responsive to a change in the load(s) 101. In some embodiments, the AVR 104 may receive the predictive load signal 106 prior to receiving/detecting a difference or error between the voltage setpoint and the output voltage of the alternator 122 (e.g., caused by the anticipated change in the load 101). Responsive to receiving the predictive load signal 106, the AVR 104 may determine to adjust the excitation current (e.g., via feedforward control) to regulate/control the transient deviation in the output voltage (e.g., caused by the anticipated change in the load 101). For instance, the AVR 104 may adjust the excitation current responsive to determining that the anticipated change in the load 101 causes a transient deviation above a predetermined level in the output voltage of the alternator 122. By adjusting the excitation current of the alternator 122, the AVR 104 may proactively regulate the output voltage of the alternator 122 responsive to a change in the load 101 (e.g., prior to detecting the difference between the voltage setpoint and the output voltage). In one example, decreasing the excitation current of the alternator 122 (e.g., responsive to receiving the predictive load signal 106) may cause a decrease in the output voltage of the alternator 122 that accommodates the anticipated change in the load 101 (e.g., a decrease in the load 101).

Figure 6:
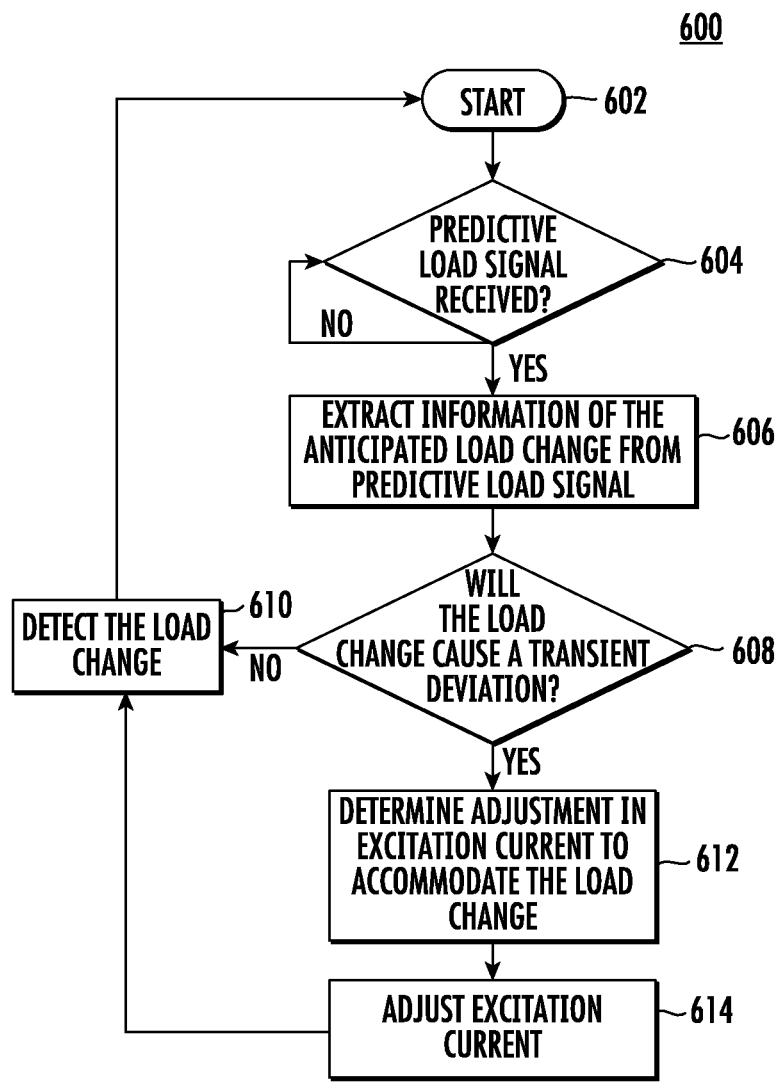
FIG. 6 is a flow diagram of a method for regulating a transient voltage of a genset, according to an exemplary embodiment.

FIG. 6 illustrates a flow diagram of a method 600 for regulating a transient voltage of a genset 102, according to an exemplary embodiment. The method 600 may be implemented using any of the components and devices detailed herein in conjunction with FIGS. 1A to 5. In operation 604, an AVR 104 (or other components of the generator system 100 or 150, such as a controller 103) may receive or obtain a predictive load signal 106. For example, the AVR 104 may receive the predictive load signal 106 from a load 101 responsive to a change in the load 101 of the genset 102 (e.g., a load increase/decrease). In operation 606, the AVR 104 may extract the information of the anticipated load change from the predictive load signal 106. For instance, the AVR 104 may extract one or more power characteristics of the anticipated change in the load 101 from the predictive load signal 106 (e.g., responsive to receiving the predictive load signal 106). In operation 608, the AVR 104 may determine whether the anticipated change in the load 101 causes a transient deviation above a predetermined level in the output voltage of the genset 102. The AVR 104 can analyze or evaluate the information extracted from the predictive load signal 106 to determine whether the anticipated change in the load 101 causes the transient deviation above the predetermined level. If the AVR 104 determines the anticipated change in the load 101 fails to cause the transient deviation, the AVR 104 may determine to maintain the excitation current of the alternator 122 at a nominal current value (e.g., determine not to adjust the excitation current). Instead, in operation 610, the AVR 104 may receive or detect a difference between a voltage setpoint and the output voltage (e.g., detect the anticipated load change). However, if the AVR 104 determines the anticipated change in the load 101 causes the transient deviation, the AVR 104 may determine an adjustment to the excitation current.

In operation 612, the AVR 104 may determine to adjust, modify, or regulate the excitation current of the alternator 122. For example, the AVR 104 may determine or calculate an amount by which to adjust the excitation current to accommodate/regulate the transient deviation caused by the anticipated change in the load 101. In some embodiments, the AVR 104 may determine the adjustment to the excitation current to reduce the transient deviation in the output voltage (e.g., reduce the transient deviation to below a predetermined level). The AVR 104 may determine the adjustment to the excitation current responsive to determining the anticipated change in the load 101 causes a transient deviation above the predetermined level. In operation 614, the AVR 104 (or the controller 103) may adjust, modify, regulate, or control the excitation current of the alternator 122. For example, the AVR 104 may adjust the excitation current according to (or based on) the calculated/determined adjustment from operation 612. The AVR 104 may adjust the excitation current of the alternator 122 prior to detecting the anticipated change in the load 101. In operation 610, the AVR 104 (or the controller 103) may detect or identify the anticipated change in the load 101. For instance, the AVR 104 may sense or identify a difference between the voltage setpoint and the output voltage of the genset 102. Once the AVR 104 detects the anticipated change in the load 101, the AVR 104 may receive another predictive load signal 106. If the AVR 104 receives another predictive load signal 106, the operations/steps of the method 600 can be repeated.

Figure 7:
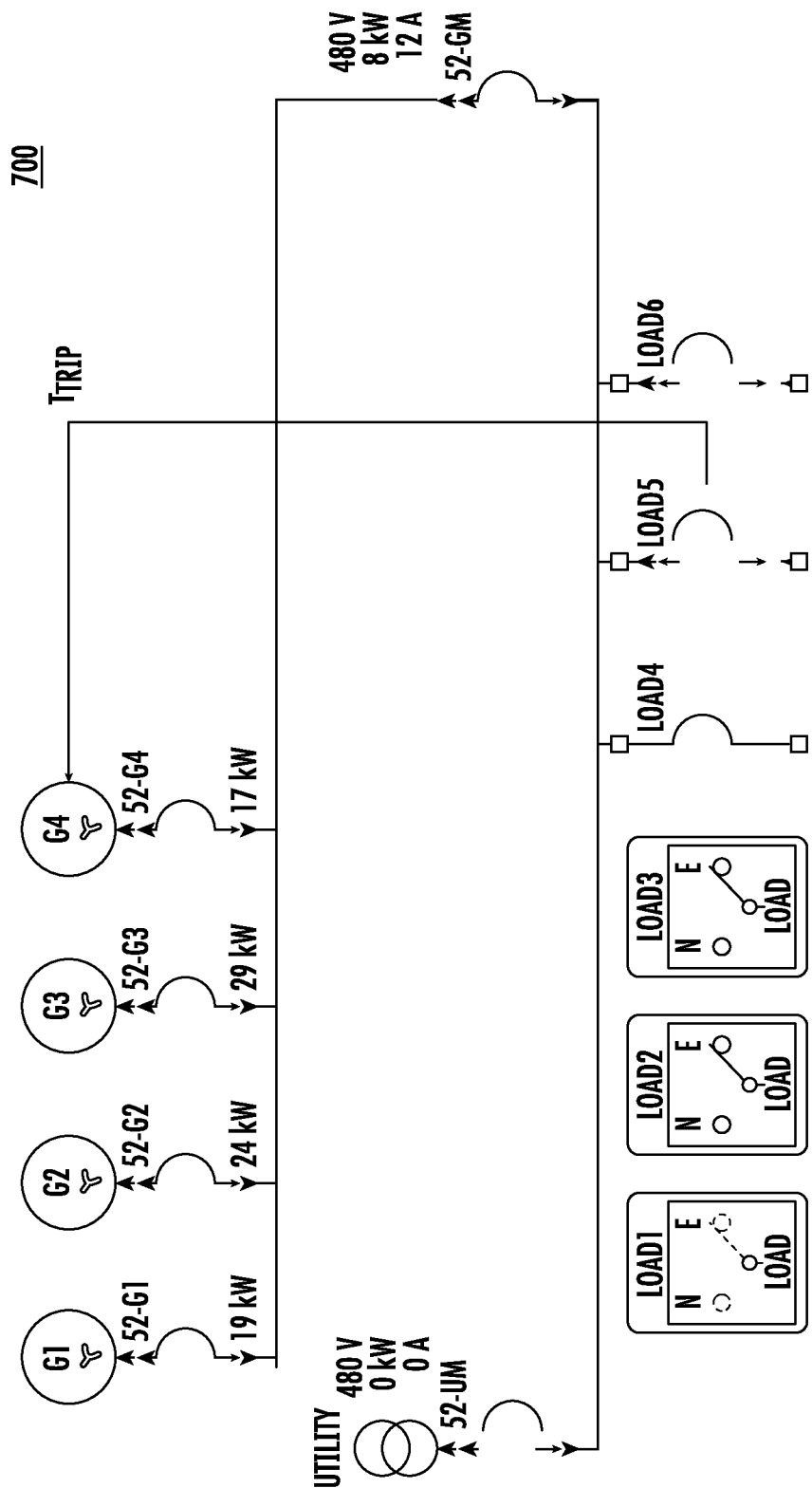
FIG. 7 is a block diagram illustrating a potential application of the systems and methods presented herein, according to an exemplary embodiment.

FIG. 7 illustrates a block diagram 700 of a potential application of the systems and methods presented herein, according to an exemplary embodiment. In some embodiments, the predictive load signal 106 may include or correspond to a circuit breaker trip command. For instance, a load 101 of the genset 102 (e.g., LOAD 5 and/or other loads) may send, communicate, or transmit a circuit breaker trip command to a genset 102 (e.g., G4 and/or other gensets 102). The load 101 may send the predictive load signal 106 responsive to a change in the load 101 (e.g., responsive to an overload/increase in the load 101). The circuit breaker trip time ($T_{TRIP}$) may be 40-60 milliseconds (or other time instances). The circuit breaker trip time can be used as the predefined interval during which the AVR 104 (or the controller 103) adjusts the excitation current to regulate the transient deviation. For instance, once the AVR 104 receives the circuit breaker trip command (e.g., the predictive load signal 106), the AVR 104 can adjust the excitation current of the genset 102 during the circuit breaker trip time (e.g., the predefined interval). By adjusting the excitation current during the circuit breaker trip time, the AVR 104 may reduce, regulate or control the transient deviation in the output voltage of the genset 102 (e.g., caused by the anticipated change in the load 101 that tripped/triggered the circuit breaker trip command).

Figure 8:
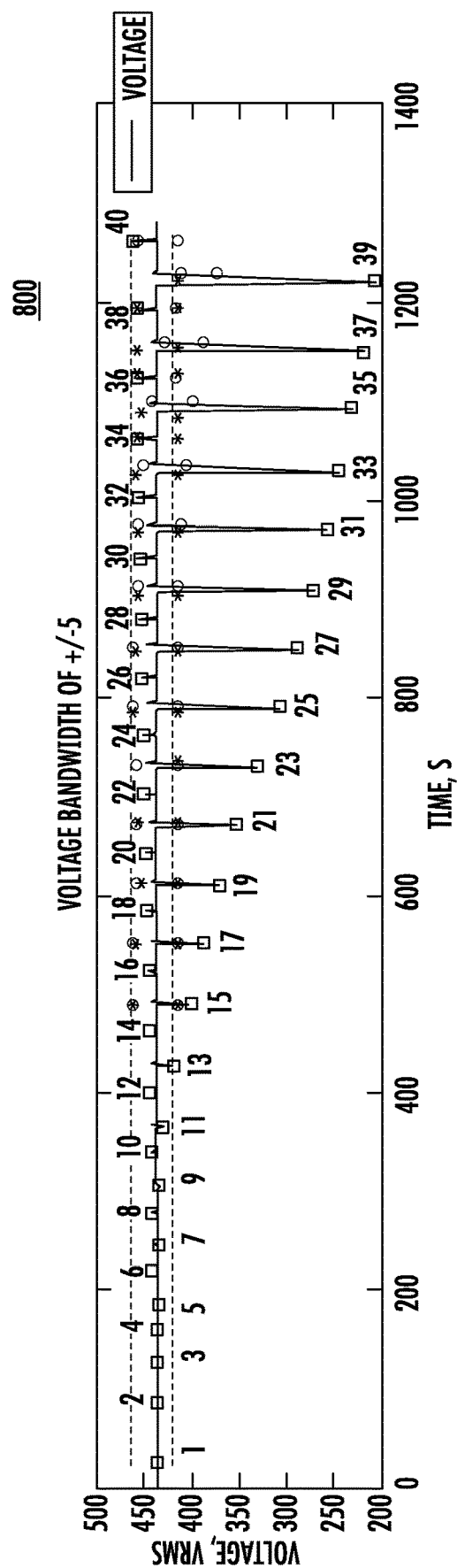
FIG. 8 is a graph illustrating one or more output voltage deviation values and one or more predetermined load change values, according to an exemplary embodiment.

FIG. 8 illustrates a graph 800 of one or more output voltage deviation values and one or more predetermined load change values, according to an exemplary embodiment. The graph 800 includes a y-axis indicating the output voltage of the genset 102 (in units of Vrms). The graph 800 includes an x-axis indicating the time (in units of seconds). In some embodiments, a genset transient test can be part of the genset product development process. During testing, the load 101 of the genset 102 can be modified (e.g., increased or decreased) using load changes (e.g., increments) of at least 5% (or other percentages) of a rated power (e.g., one or more predetermined load change values). Each change in the load 101 of the genset 102 (e.g., load increase or decrease) may cause a transient deviation in the output voltage of the genset 102 (e.g., one or more output voltage deviation values). In the graph 800, the transient deviations are identified by the reference numerals 1 through 40. The horizontal dotted lines indicate a ±5 V bandwidth from the nominal/rated voltage of the genset 102. The horizontal dotted lines may include or correspond to the predetermined level.

In some embodiments, the AVR 104 (or other components of the genset 102) can measure, store, and/or maintain the output voltage deviation values and/or the corresponding predetermined load change values (e.g., the 5% load increments). For instance, the AVR 104 may store the output voltage deviation values and/or the corresponding predetermined load change values in a table. Responsive to determining an anticipated change in the load 101 causes a transient deviation above the predetermined level, the AVR 104 may compare the information of the anticipated change in the load 101 to the values stored in the table. For example, the AVR 104 may compare a numeric load change to the one or more predetermined load change values stored in the table. Responsive to the comparison, the AVR 104 may estimate or determine the transient deviation caused by the anticipated change in the load 101. For instance, the AVR 104 may determine that at least one stored predetermined load change value corresponds to the anticipated change in the load 101. Responsive to the determination, the AVR 104 may identify the associated output voltage deviation value stored in the table. Therefore, the AVR 104 may determine the anticipated change in the load 101 causes a transient deviation that corresponds to the identified output voltage deviation value stored in the table. Responsive to estimating/determining the transient deviation in the output voltage, the AVR 104 may adjust or modify the excitation current to regulate/control/reduce the transient deviation (e.g., caused by the anticipated change in the load 101).

The disclosure is described above with reference to drawings. These drawings illustrate certain details of specific embodiments that implement the systems and methods and programs of the present disclosure. However, describing the disclosure with drawings should not be construed as imposing on the disclosure any limitations that may be present in the drawings. The present disclosure contemplates methods, systems and program products on any machine-readable media for accomplishing its operations. The embodiments of the present disclosure may be implemented using an existing computer processor, or by a special purpose computer processor incorporated for this or another purpose or by a hardwired system. No claim element herein is to be construed under the provisions of 35 U.S.C. § 112, sixth paragraph, unless the element is expressly recited using the phrase "means for." Furthermore, no element, component or method step in the present disclosure is intended to be dedicated to the public, regardless of whether the element, component or method step is explicitly recited in the claims.

As noted above, embodiments within the scope of the present disclosure include program products comprising machine-readable storage media for carrying or having machine-executable instructions or data structures stored thereon. Such machine-readable storage media can be any available media that can be accessed by a computer or other machine with a processor. By way of example, such machine-readable storage media can include RAM, ROM, EPROM, EEPROM, CD ROM or other optical disk storage, magnetic disk storage or other magnetic storage devices, or any other medium which can be used to carry or store desired program code in the form of machine-executable instructions or data structures and which can be accessed by a computer or other machine with a processor. Combinations of the above are also included within the scope of machine-readable storage media. Machine-executable instructions include, for example, instructions and data which cause a computing device or machine to perform a certain function or group of functions. Machine or computer-readable storage media, as referenced herein, do not include transitory media (i.e., signals in space).

Embodiments of the disclosure are described in the general context of method steps which may be implemented in one embodiment by a program product including machine-executable instructions, such as program code, for example, in the form of program modules executed by machines in networked environments. Generally, program modules include routines, programs, objects, components, data structures, etc., that perform particular tasks or implement particular abstract data types. Machine-executable instructions, associated data structures, and program modules represent examples of program code for executing steps of the methods disclosed herein. The particular sequence of such executable instructions or associated data structures represent examples of corresponding acts for implementing the functions described in such steps.

Embodiments of the present disclosure may be practiced in a networked environment using logical connections to one or more remote computers having processors. Logical connections may include a local area network (LAN) and a wide area network (WAN) that are presented here by way of example and not limitation. Such networking environments are commonplace in office-wide or enterprise-wide computer networks, intranets and the Internet and may use a wide variety of different communication protocols. Those skilled in the art will appreciate that such network computing environments will typically encompass many types of computer system configurations, including personal computers, hand-held devices, multi-processor systems, microprocessor-based or programmable consumer electronics, network PCs, servers, minicomputers, mainframe computers, and the like. Embodiments of the disclosure may also be practiced in distributed computing environments where tasks are performed by local and remote processing devices that are linked (either by hardwired links, wireless links, or by a combination of hardwired or wireless links) through a communications network. In a distributed computing environment, program modules may be located in both local and remote memory storage devices.

An exemplary system for implementing the overall system or portions of the disclosure might include a computing device that includes, for example, a processing unit, a system memory, and a system bus that couples various system components including the system memory to the processing unit. The system memory may include read only memory (ROM) and random access memory (RAM) or other non-transitory storage medium. The computer may also include a magnetic hard disk drive for reading from and writing to a magnetic hard disk, a magnetic disk drive for reading from or writing to a removable magnetic disk, and an optical disk drive for reading from or writing to a removable optical disk such as a CD ROM or other optical media. The drives and their associated machine-readable media provide nonvolatile storage of machine-executable instructions, data structures, program modules, and other data for the computer.

It should be noted that although the flowcharts provided herein show a specific order of method steps, it is understood that the order of these steps may differ from what is depicted. Also two or more steps may be performed concurrently or with partial concurrence. Such variation will depend on the software and hardware systems chosen and on designer choice. It is understood that all such variations are within the scope of the disclosure. Likewise, software and web implementations of the present disclosure could be accomplished with standard programming techniques with rule based logic and other logic to accomplish the various database searching steps, correlation steps, comparison steps and decision steps. It should also be noted that the word "component" as used herein and in the claims is intended to encompass implementations using one or more lines of software code, and/or hardware implementations, and/or equipment for receiving manual inputs.

The foregoing description of embodiments of the disclosure have been presented for purposes of illustration and description. It is not intended to be exhaustive or to limit the disclosure to the precise form disclosed, and modifications and variations are possible in light of the above teachings or may be acquired from practice of the disclosure. The embodiments were chosen and described in order to explain the principals of the disclosure and its practical application to enable one skilled in the art to utilize the disclosure in various embodiments and with various modifications as are suited to the particular use contemplated.

What is claimed is:

1. A method of regulating transient deviations in an output voltage of a generator set (genset) comprising:
   receiving, by an automatic voltage regulator of the genset from a load, a predictive load signal relating to an anticipated change in the load, wherein the predictive load signal is configured to include information of the anticipated change in the load;

extracting, by the automatic voltage regulator, the information of the anticipated change in the load from the predictive load signal, responsive to receiving the predictive load signal;

analyzing, by the automatic voltage regulator, the extracted information to determine whether the anticipated change in the load causes a transient deviation above a predetermined level in the output voltage of the genset; and adjusting, by the automatic voltage regulator, an excitation current of an alternator of the genset prior to detecting a difference between a voltage setpoint and the output voltage, responsive to determining that the anticipated change in the load causes the transient deviation in the output voltage.

2. The method of claim 1, further comprising:
modifying, by the automatic voltage regulator, the excitation current back to a nominal current value after a period of time.

3. The method of claim 1, wherein the predictive load signal comprises a datalink signal, a circuit breaker trip command, a temperature trigger signal, an analog voltage input, or a discrete switch input.

4. The method of claim 1, wherein the information of the anticipated change in the load includes one or more power characteristics of the anticipated change in the load, the one or more power characteristics comprising a power numerical, a power factor, an inductance, or a capacitance.

5. The method of claim 1, further comprising:
adjusting, by the automatic voltage regulator, the excitation current within a predefined interval to regulate the transient deviation in the output voltage, the predefined interval comprising an interval of time between receiving the predictive load signal and detecting the difference between the voltage setpoint and the output voltage.

6. The method of claim 1, further comprising:
maintaining, by the automatic voltage regulator, the excitation current as a nominal current value responsive to determining that the anticipated change in the load fails to cause a transient deviation above the predetermined level in the output voltage of the genset.

7. The method of claim 1, wherein analyzing the extracted information and adjusting the excitation current comprises:
storing, by the automatic voltage regulator, a table comprising one or more output voltage deviation values and one or more predetermined load change values, wherein the one or more output voltage deviation values are associated with the one or more predetermined load change values;
comparing, by the automatic voltage regulator, the information of the anticipated change in the load to the output voltage deviation values or the predetermined load change values stored in the table;
determining, by the automatic voltage regulator, whether the anticipated change in the load causes a transient deviation above the predetermined level in the output voltage, responsive to comparing the information of the anticipated change in the load to the output voltage deviation values or the predetermined load change values stored in the table; and
adjusting, by the automatic voltage regulator, the excitation current of the alternator according to the output voltage deviation values or the predetermined load change values stored in the table, responsive to determining the anticipated change in the load causes the transient deviation in the output voltage.

8. The method of claim 1, wherein adjusting the excitation current of the alternator comprises regulating the transient deviation in the output voltage to a voltage value that is up to 20% of a nominal voltage value.

9. A control device for an automatic voltage regulator comprising:
a machine-readable storage medium having instructions stored thereon; and
a processing circuit configured to execute the instructions to:
receive a predictive load signal relating to an anticipated change in a load of a generator set (genset) from the load, wherein the predictive load signal is configured to include information of the anticipated change in the load;
extract the information of the anticipated change in the load from the predictive load signal, responsive to receiving the predictive load signal;
analyze the extracted information to determine whether the anticipated change in the load causes a transient deviation above a predetermined level in an output voltage of the genset; and
adjust an excitation current of an alternator of the genset prior to detecting a difference between a voltage setpoint and the output voltage, responsive to determining that the anticipated change in the load causes the transient deviation in the output voltage.

10. The control device of claim 9, wherein the processing circuit is configured to modify the excitation current back to a nominal current value after a period of time.

11. The control device of claim 9, wherein the information of the anticipated change in the load includes one or more power characteristics of the anticipated change in the load, the one or more power characteristics comprising a power numerical, a power factor, an inductance, or a capacitance.

12. The control device of claim 9, wherein the processing circuit is configured to adjust the excitation current within a predefined interval to regulate the transient deviation in the output voltage, the predefined interval comprising an interval of time between receiving the predictive load signal and detecting the difference between the voltage setpoint and the output voltage.

13. The control device of claim 9, wherein the processing circuit is configured to maintain the excitation current as a nominal current value responsive to determining that the anticipated change in the load fails to cause a transient deviation above the predetermined level in the output voltage of the genset.

14. The control device of claim 9, wherein the processing circuit is configured to:
store a table comprising one or more output voltage deviation values and one or more predetermined load change values, wherein the one or more output voltage deviation values are associated with the one or more predetermined load change values;
compare the information of the anticipated change in the load to the output voltage deviation values or the predetermined load change values stored in the table;
determine whether the anticipated change in the load causes a transient deviation above the predetermined level in the output voltage, responsive to comparing the information of the anticipated change in the load to the output voltage deviation values or the predetermined load change values stored in the table; and
adjust the excitation current of the alternator according to the output voltage deviation values or the predetermined load change values stored in the table, responsive to determining the anticipated change in the load causes the transient deviation in the output voltage.

15. A power generator system comprising:
an alternator coupled to an engine configured to supply power to a load,
an automatic voltage regulator configured to adjust an excitation current of the alternator to regulate an output voltage of the alternator; and
a controller comprising a processing circuit configured to:
receive a predictive load signal relating to an anticipated change in the load from the load, wherein the predictive load signal is configured to include information of the anticipated change in the load;
extract the information of the anticipated change in the load from the predictive load signal, responsive to receiving the predictive load signal;
analyze the extracted information to determine whether the anticipated change in the load causes a transient deviation above a predetermined level in the output voltage of the power generator system; and
adjust the excitation current prior to detecting a difference between a voltage setpoint and the output voltage, responsive to determining that the anticipated change in the load causes the transient deviation in the output voltage.

16. The power generator system of claim 15, wherein the controller is configured to modify the excitation current back to a nominal current value after a period of time.

17. The power generator system of claim 15, wherein the information of the anticipated change in the load includes one or more power characteristics of the anticipated change in the load, the one or more power characteristics comprising a power numerical, a power factor, an inductance, or a capacitance.

18. The power generator system of claim 15, wherein the controller is configured to adjust the excitation current within a predefined interval to regulate the transient deviation in the output voltage, the predefined interval comprising an interval of time between receiving the predictive load signal and detecting the difference between the voltage setpoint and the output voltage.

19. The power generator system of claim 15, wherein the controller is configured to maintain the excitation current as a nominal current value responsive to determining that the anticipated change in the load fails to cause a transient deviation above the predetermined level in the output voltage of the power generator system.

20. The power generator system of claim 15, wherein the controller is configured to:
store a table comprising one or more output voltage deviation values and one or more predetermined load change values, wherein the one or more output voltage deviation values are associated with the one or more predetermined load change values;
compare the information of the anticipated change in the load to the output voltage deviation values or the predetermined load change values stored in the table;
determine whether the anticipated change in the load causes a transient deviation above the predetermined level in the output voltage, responsive to comparing the information of the anticipated change in the load to the output voltage deviation values or the predetermined load change values stored in the table; and
adjust the excitation current of the alternator according to the output voltage deviation values or the predetermined load change values stored in the table, responsive to determining the anticipated change in the load causes the transient deviation in the output voltage.

* * * * *